United States Patent
Uttley et al.

(10) Patent No.: US 9,463,819 B2
(45) Date of Patent: Oct. 11, 2016

(54) PORTABLE MEDICAL CART SYSTEM

(71) Applicant: HUNTINGDON TELEMED, LLC, Bonita Springs, FL (US)

(72) Inventors: Thomas Uttley, Naples, FL (US); David Boll, Cleveland, OH (US); William Rabbitt, Cleveland, OH (US); James Szpak, Cleveland, OH (US); Jason Tilk, Cleveland, OH (US); Robert Vystrcil, Cleveland, OH (US); Paul Stephens, Cleveland, OH (US)

(73) Assignee: Huntingdon Telemed, LLC., Bonita Springs, FL (US)

( * ) Notice: Subject to any disclaimer, the term of this patent is extended or adjusted under 35 U.S.C. 154(b) by 0 days.

(21) Appl. No.: 14/689,403

(22) Filed: Apr. 17, 2015

(65) Prior Publication Data

US 2015/0298717 A1 Oct. 22, 2015

Related U.S. Application Data

(63) Continuation-in-part of application No. 14/255,556, filed on Apr. 17, 2014, now Pat. No. 9,179,493.

(51) Int. Cl.
*B62B 1/12* (2006.01)
*B62B 3/02* (2006.01)
*B62B 5/06* (2006.01)

(52) U.S. Cl.
CPC ............... *B62B 3/022* (2013.01); *B62B 3/02* (2013.01); *B62B 5/067* (2013.01); *B62B 2202/56* (2013.01)

(58) Field of Classification Search
CPC ........... B62B 1/12; B62B 1/125; B62B 3/02; B62B 3/01; B62B 5/0083; B62B 2202/404; B62B 2202/406; B62B 1/262
See application file for complete search history.

(56) References Cited

U.S. PATENT DOCUMENTS

| 5,924,988 | A | * | 7/1999 | Burris | ............... A61B 8/00 600/437 |
| 7,518,508 | B2 | * | 4/2009 | Cvek | ............ A47B 21/0073 312/223.2 |

(Continued)

OTHER PUBLICATIONS

Esteban Martin Kloosterman, et al., "Real-Time Remote Interrogation and Guided Reprogramming of Cardiac Implantable Electronic Devices." The Journal of Innovations in Cardiac Rhythm Management, vol. 4, pp. 1320-1324, Jul. 2013.

(Continued)

*Primary Examiner* — John Walters
*Assistant Examiner* — James Triggs
(74) *Attorney, Agent, or Firm* — Renner, Otto, Boisselle & Sklar, LLP.

(57) ABSTRACT

A portable cart is convertible between a collapsed state for improving storage and transportation, and an expanded state for deploying a modular workstation that may be used for remote medical care. The cart includes a collapsible frame having support members that are pivotable between an open and closed position, and a central upright frame that guides a strut member from a retracted position to an upright extended position. The strut member is lockable in the upright position, and the workstation module is configured to mount to and dismount from the extended strut member. The workstation module may include an interface assembly that enables a patient to communicate with a doctor that is remotely located from the cart. A power module may also be mounted to the cart for powering the workstation module. The cart may easily be transported or stored by dismounting the workstation module and collapsing the frame.

33 Claims, 17 Drawing Sheets

(56) References Cited

U.S. PATENT DOCUMENTS

| | | | |
|---|---|---|---|
| 8,286,977 B2 * | 10/2012 | Butler | A61G 12/001 280/47.34 |
| 8,534,779 B2 * | 9/2013 | Schaaf | A47B 46/005 312/272.5 |
| 8,662,605 B2 | 3/2014 | McRorie et al. | |
| 2005/0288571 A1 * | 12/2005 | Perkins | A61B 5/0002 600/407 |
| 2008/0185945 A1 | 8/2008 | Low | |
| 2012/0212116 A1 | 8/2012 | McRorie et al. | |

OTHER PUBLICATIONS

"First Exam, Mobile Telemedicine Station", GlobalMed, www.globalmed.com, 4 pages, 2013.

"Mobile Telemedicine Station", GlobalMed, www.globalmed.com, 2 pages, 2012.

"Transportation Exam Station", GlobalMed, www.globalmed.com, 2 pages, 2013.

* cited by examiner

PORTABLE MEDICAL CART SYSTEM

FIELD OF INVENTION

The present invention relates generally to remote medical care, and more particularly to a portable medical cart system.

BACKGROUND

In some cases, access to medical care may not be widely available, particularly in rural areas or even urban areas that are significantly spread out. In other cases, care may be available, but the cost of providing individualized care may be prohibitive to patients and/or insurance programs.

Remote care systems have been proposed in which a doctor or other medical practitioner may provide some level of care from a location remote to the patient. However, these known remote care systems may be less than optimal because they do not enable the patient to experience interaction with the doctor as if the patient and doctor were in the same room.

In addition, the known remote care systems are effectively bound to a single medical facility because of their weight, construction, power structure, etc., and are not known to be easily transported from one facility to another facility. The cost of remote care systems that are effectively bound to a single medical facility may be prohibitive because multiple systems would be needed to service multiple facilities, which increases costs and reduces availability of care.

SUMMARY OF INVENTION

The present disclosure provides a portable cart that is easily convertible between a collapsed state for improving storage and transportation, and an expanded state for deploying a workstation that may be used to facilitate medical care of a patient. The cart includes a collapsible frame and the workstation may be configured as a module that is easily mounted to and dismounted from the frame. The workstation module may include an interface assembly that enables the patient to communicate with a doctor or other practitioner that is remotely located from the cart. A power module may also be mounted to the cart for supplying power to the workstation module. The cart is relatively compact in its collapsed state and the modularity of the workstation further improves compactness and portability.

According to a general aspect of the invention, a portable cart includes a collapsible frame and a strut member configured to extend to an upright position for receiving a workstation module that may be used to facilitate care of a patient.

According to another aspect of the invention, a portable cart for mounting and dismounting a workstation includes a pair of collapsible support members pivotable relative to each other about a common axis between a closed position and an open position; a central upright frame configured guide a strut member from a retracted position to an extended upright position; and a pivoting assembly pivotably disposed in relation to the central upright frame, wherein the pivoting assembly is operatively connected to the respective support members for enabling pivoting of the support members between the closed position and the open position.

Embodiments of the invention may include one or more of the following additional features.

In some embodiments, the pivoting assembly includes a pair of hinge plates that each rotate relative to each other about the common axis, and the respective support members are operatively connected to the respective hinge plates.

In some embodiments, the respective hinge plates each have a locking slot, and the pivoting assembly includes a locking pin configured for being received in the respective locking slots at a locked position to engage the respective hinge plates and restrict relative movement of the hinge plates.

In some embodiments, the locking pin is moveable relative to the respective hinge plates for selectively disengaging from the locked position and enabling the respective hinge plates to move relative to each other.

In some embodiments, the central upright frame includes a hub about which the respective hinge plates rotate relative to the central upright frame.

In some embodiments, the central upright frame is vertically oriented perpendicular to the ground upon which the respective support members are placed.

The central upright frame may remain in an upright position as the respective hinge plates rotate about the common axis.

In some embodiments, the respective hinge plates include axially extending holding tabs for engaging the central upright frame to restrict movement of the central upright frame relative to the hinge plates as the hinge plates rotate about the common axis.

In some embodiments, the cart includes a slider mechanism operatively connected to a linkage that is operatively connected to the respective support members, and the slider mechanism is slidably moveable via the linkage between an upward position and a downward position in response to the support members respectively pivoting between the open position and the closed position.

In some embodiments, the slider mechanism is disposed within a guide slot of the central upright frame.

The interaction of the linkage and the slider mechanism within the guide slot of the upright frame may enable the central upright frame to remain in an upright, such as vertical, position as the support members pivot between the open and closed positions.

In some embodiments, the slider mechanism includes a spring biased pawl moveable between a retracted position and an engaging position, with the spring biased pawl being biased toward the engaging position.

For example, when the support members are pivotably disposed toward the closed position and the slider mechanism is slidably disposed toward the downward position, the spring biased pawl may be in the retracted position. When the support members are pivotably disposed toward the open position and the slider mechanism is slidably disposed toward the upward position, the spring biased pawl may be in the engaging position and engages the strut member for locking the strut member in place when the strut member is in the extended position.

In some embodiments, the slider mechanism is slidably disposed within a slider guide slot of the central upright frame that has a back guiding surface. The strut member may be slidably disposed within a strut guide slot or groove of the central upright frame that is opposite the slider guide slot. When the slider mechanism is slidably disposed toward the downward position, the spring biased pawl may engage the back guiding surface of the slider guide slot and may be forced toward the retracted position. When the slider mechanism is slidably disposed toward the upward position, the spring biased pawl extends through an opening in the back guiding surface of the slider guide slot and lockingly engages the strut member through an opening in the strut member when the strut member is in the extended position.

In some embodiments, the strut member is a handle for enabling the user to grasp the handle and transport the cart when the cart is collapsed into a transportation mode.

In some embodiments, the central upright frame includes detents configured to selectively maintain the handle member in the extended position or the retracted position.

In some embodiments, the cart includes a workstation module that is mountable to and dismountable from the strut member when the strut member is in the upright extended position.

In some embodiments, the workstation module includes a recessed portion, and an upper portion of the strut member may be received within the recessed portion of the workstation module.

The recessed portion of the workstation module may be adequately sized to receive the strut member for stably mounting the workstation module on the strut member.

In some embodiments, the workstation module is mountable to and dismountable from one of the support members, such as for transporting the workstation module when the cart is collapsed into a transportation mode or storage mode.

In some embodiments, the workstation module includes latches or clasps that engage respective hooks or pins on one of the support members for enabling the workstation module to be easily mounted or dismounted.

In some embodiments, the workstation module is enclosed within a case that has opposite first and second sides. The respective first and second sides may each have a door, for example hingedly opened or closed with a latch, that is configured for protecting or accessing respective first and second workstations on the respective first and second sides.

In some embodiments, the first workstation on the first side is a patient workstation having an interface assembly including a display, a speaker, a camera, and a microphone.

In some embodiments, the speaker and microphone are combined into a single unit, the combined speaker/microphone unit being mountable to and dismountable from the workstation module, such as for facilitating hearing or speaking by the patient, for example, if the patient is elderly or bedridden.

In some embodiments, the camera may be swivably disposed on the workstation module for aiming the camera at the patient, for example, if the patient is lying in bed.

In some embodiments, the inside of the door of the first workstation includes recesses for receiving the combined speaker/microphone, camera, and display to maintain the positions thereof when the workstation module is being transported.

In some embodiments, the workstation module includes a communications module configured to receive a video and audio communication corresponding to a transmission from a doctor at a location remote from a location of the cart, and further configured to cause the video to show on the display and the audio to play through the speaker; the communication module further configured to receive a video image from the camera and sound from the microphone and to transmit the video image and the sound to the location remote from the location of the cart.

In some embodiments, the second workstation on the second side of the workstation module is a caregiver workstation, and the door on the caregiver side may be hingedly connected to the workstation module and deployable from a closed position to an open position to form a workstation platform to facilitate a workspace for the caregiver located with the patient.

The workstation platform, such as a tray, may open away from the workstation module and may be positioned essentially parallel to the ground upon which the support members are positioned, or the platform may be angled, such as at discrete angles relative to the ground.

In some embodiments, the caregiver workstation includes a computer connected to the interface assembly and/or cables for connecting a computer to the interface assembly. The computer may be optionally detachable from the workstation module and/or deployable in a wireless configuration to communicate with the interface assembly via a wireless communication interface.

In some embodiments, the cart further includes a power module mounted to one of the support members, the power module including a power source for providing power to the workstation module, for example, the interface assembly and/or the computer.

The power source may include a battery, such as a rechargeable battery, or may provide cables and other components for connecting to an AC power source.

The power module may include an indicator for indicating battery life and/or indicating that the power is turned on.

In some embodiments, the power module includes a printer that may be configured to communicate with the computer, such as via cables or wirelessly.

The power source and/or the printer and associated components may be enclosed within a case.

The power module may include a door hingedly attached to the power module for accessing or protecting the power source and/or printer assembly.

In some embodiments, the power module is pivotably mounted to one of the support members and pivotable between an upright storage position, and a horizontal working position in which the power module straddles the respective support members.

For example, the power module may be pivotably mounted to a lateral brace at a lower portion of one of the support members, and may be pivoted to the horizontal working position to engage a lateral brace on the opposite support member when the support members are in the open position. The straddling of the power module across the respective support members may having a locking effect to restrict pivoting of the support members to the closed position.

In some embodiments, the power module includes latches that engage respective pins on the support member when the power module is in the storage position.

The power module may be pivotably mounted to the support member, or the power source may be mountable to or dismountable from the support member in a manner similar to the workstation module.

In some embodiments, each support member includes a pair of legs laterally spaced from each other.

The cart may include two pairs of hinge plates laterally spaced from each other, the respective pairs of hinge plates respectively operatively connected to the respective legs.

The cart may also include a pair of central upright frames laterally spaced from each other and disposed central to the respective pairs of hinge plates, for example, perpendicular to the common pivot axis of the respective pairs of hinge plates.

The cart may also include a central cross-member operatively connecting the pair of central upright frames.

The central cross-member may have a recess on an upper portion for enabling a user to grip the handle or strut. Optionally or additionally, the central cross-member may have a recess on a lower portion for enabling a user to grip and transport the cart, for example, lifting the cart into a vehicle.

The respective pairs of legs may each be operatively connected by a lateral brace.

In some embodiments, the respective support members include wheels at respective lower portions for enhancing the portability of the cart.

The wheels on a first support member may include wheels connected by an axle, and the wheels on a second support member may include casters for improved swivability of the cart.

According to another aspect of the invention, a portable cart has a collapsible frame, including a pair of support members pivotable relative to each other about a common axis between an open position and a closed position, and a lockable hinge mechanism connecting respective upper portions of the support members.

The lockable hinge mechanism may include opposing hinge plates each having a locking slot radially spaced from the common axis, and the hinge plates may be rotatable relative to each other about the common axis. A locking pin may axially extend into the respective locking slots, the locking pin being radially moveable within the respective locking slots for enabling the respective hinge plates to move relative to each other between a locked position and an unlocked position.

The respective locking slots may be configured with a lock portion having a surface for engaging the locking pin in the locked position and limiting relative movement of the hinge plates when the support members are in the closed position.

The respective locking slots may be configured with an unlock portion having a surface for engaging the locking pin in the unlocked position that enables radial movement of the locking pin for permitting the relative movement of the hinge plates when the support members are in the open position.

Embodiments of the invention may include one or more of the following additional features.

In some embodiments, the respective lock portion surfaces are radially extending surfaces configured to engage a side of the locking pin perpendicular to the radial movement direction of the locking pin to restrict radial movement of the locking pin and to restrict relative movement of the respective hinge plates.

In some embodiments, the respective unlock portion surfaces are ramped surfaces, for example sloped with respect to the radially extending lock portion surface, and the respective ramped surfaces are configured to engage and radially move the locking pin in response to the rotational movement of the respective hinge plates.

In some embodiments, the locking pin is operatively connected to a lock slide, the locking pin axially extending from the lock slide, and the lock slide is moveable in the radial direction for effecting radial movement of the locking pin.

In some embodiments, the lock slide is received within a groove or slot of a lock plate, the lock plate operatively connected to the central upright frame and configured to prevent rotational movement of the lock plate and lock slide.

In some embodiments, a shell encloses the hinge plates, and an upper portion of the lock slide may be configured as a button that is accessible through an opening in the shell.

In some embodiments, the lock slide is spring biased in the radial direction. For example, when the button is depressed, the spring force of the spring biased lock slide may be overcome, and the locking pin is thereby moved radially inwardly to disengage from the respective lock portions of the locking slots enabling movement of the hinge plates relative to each other.

In some embodiments, the hinge mechanism may including a plurality of locking pins and a plurality of locking slots radially spaced in each hinge plate. The locking slots may each be configured for receiving a locking pin, such as for effectively distributing the pivoting force of the support members over multiple pins.

In some embodiments, the hinge plates include an outer hinge plate disposed axially adjacent to an inner hinge plate. The respective hinge plates may each include a pair of holding tabs configured to extend axially inwardly toward the central upright frame. The inner hinge plate may include apertures for interlockingly receiving the respective holding tabs of the outer hinge plate, and the respective holding tabs of the inner hinge plate and the outer hinge plate may be configured to engage the upright frame in a scissoring action to limit movement of the upright frame member relative to the hinge plates, such as when the support members are pivoted.

In some embodiments, the hinge plates are operatively connected to the support members by at least one of fastening, adhering, or integrally forming, for example, as a unitary member.

According to another aspect of the invention, a method of deploying a portable cart from a collapsed storage mode to an expanded working mode is provided, including the steps: (i) unlocking a hinge mechanism operatively connected to a pair of support members positioned proximal each other in a closed state, the hinge mechanism being pivotably disposed in relation to a central upright frame that receives an extendable strut member; (ii) pivoting the support members away from each other from the closed position to an open position; (iii) extending the strut member from a retracted position to an extended position; (iv) locking the strut member in place; and (v) mounting a workstation module onto the strut member.

The method of deploying the cart may further include the steps: (i) during the pivoting of the support members to the open position, simultaneously moving a slider mechanism having a spring biased pawl from a downward position to an upward position via a linkage operatively connecting the slider mechanism to the respective support members, whereby the spring biased pawl moves from a retracted position to an engaging position for engaging the strut member; and (iii) locking the strut member in place with the spring biased pawl.

A method of converting the cart from an expanded working mode to a collapsed storage mode includes the steps: (i) dismounting the workstation module from the strut member; (ii) pivoting the support members to the closed position; (iii) retracting the strut member from the extended position to a retracted position; and (iv) optionally mounting the workstation module to one of the support members.

A method of converting the portable cart from a storage mode to a transportation mode includes the steps: (i) extending the strut member, such as a handle, from a retracted position to an extended position; (ii) engaging detents located in the central upright frame with detent recesses in the strut member; (iii) optionally tilting the collapsed cart onto wheels located at the bottom of one of the support members; and (iv) optionally transporting the cart via the wheels.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

Figure 1:
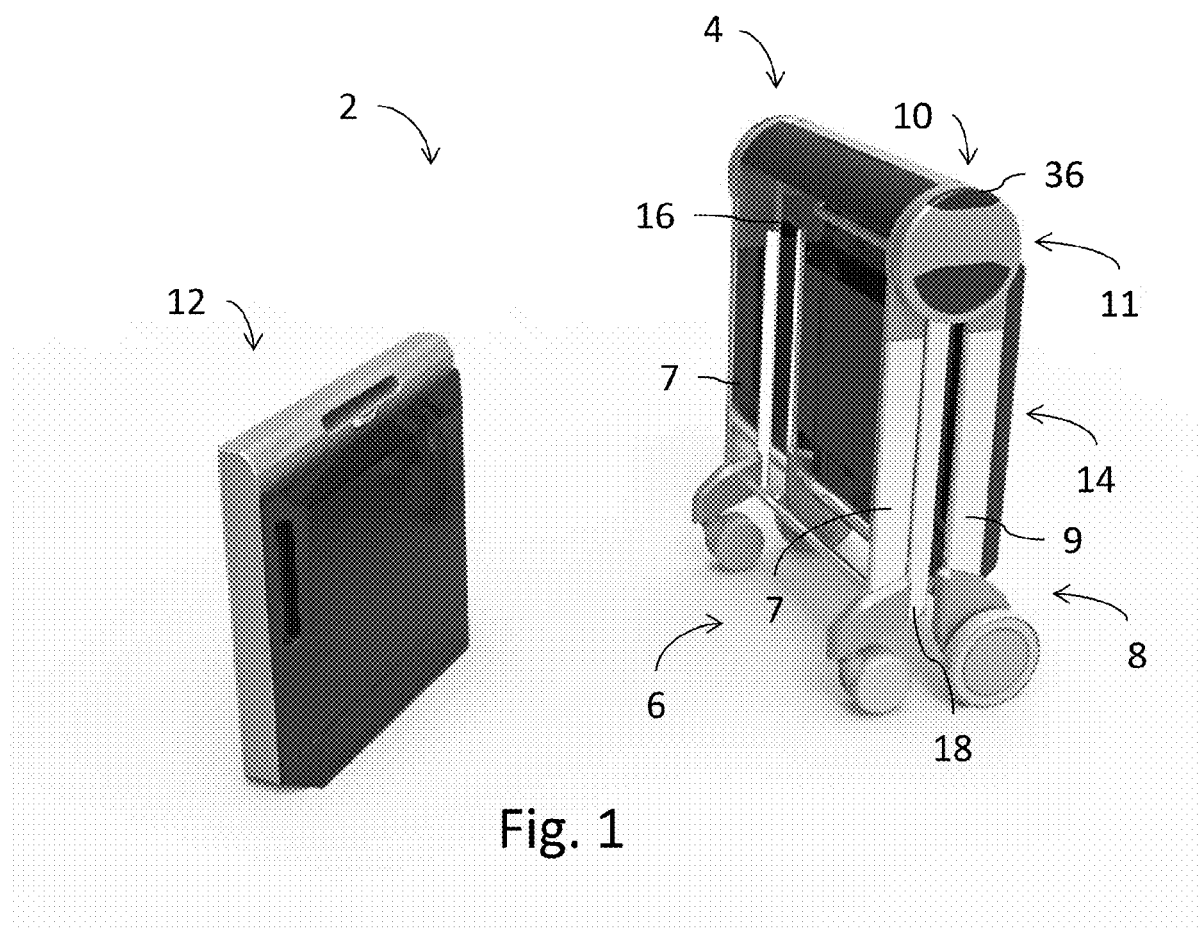
FIG. 1 illustrates a perspective front view of an exemplary cart system in a collapsed state with a module that is dismounted.

A portable cart is provided that is collapsible for improving storage and transportation, and expandable for deploying a workstation module for facilitating medical care. The cart includes collapsible support members and an extendable upright strut member. The workstation module is easily mounted to and dismounted from the strut member. The workstation module may include an interface assembly that enables the patient to communicate with a doctor or other caregiver that is remotely located from the cart.

The principles of the present invention have particular application to portable cart systems for remote medical care, and will be described below chiefly in this context. It will of course be appreciated, and also understood, that principles of this invention may be applicable to other portable cart systems where it is desirable to provide a cart that is easily collapsible for storage and transportation, and is also easily deployable for providing a workstation.

Turning now to FIGS. 1-4, an exemplary portable cart system 2 is shown. The cart 2 includes a frame assembly 4 having support members 6 and 8, a central frame assembly 10, and a pivoting assembly 11 operatively connected to the respective support members 6 and 8. The support members 6 and 8 may each have laterally spaced legs 7 and 9. A module 12, such as a workstation module, is mountable to and dismountable from one of the support members 6 (shown in FIGS. 1 and 2). Another module 14, such as a power module 14, may be mounted to the opposite support member 8.

Figure 2:
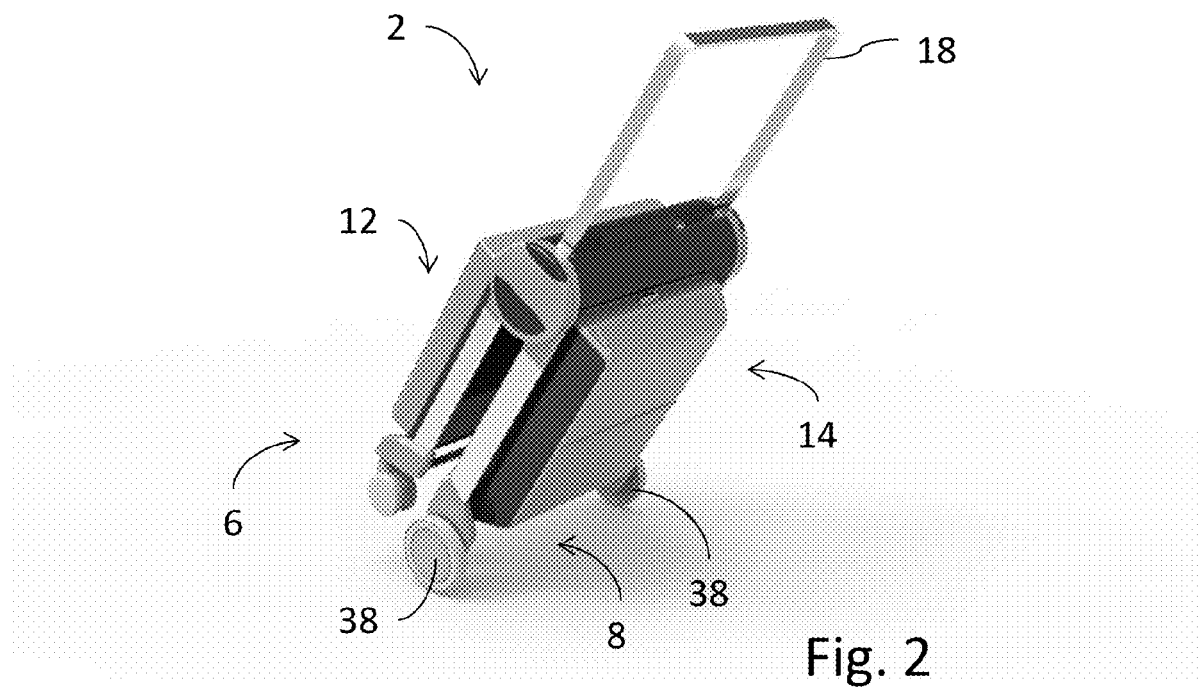
FIG. 2 illustrates a perspective rear view of the cart in FIG. 1 shown in a transportation mode with the module in FIG. 1 mounted.
Figure 3:
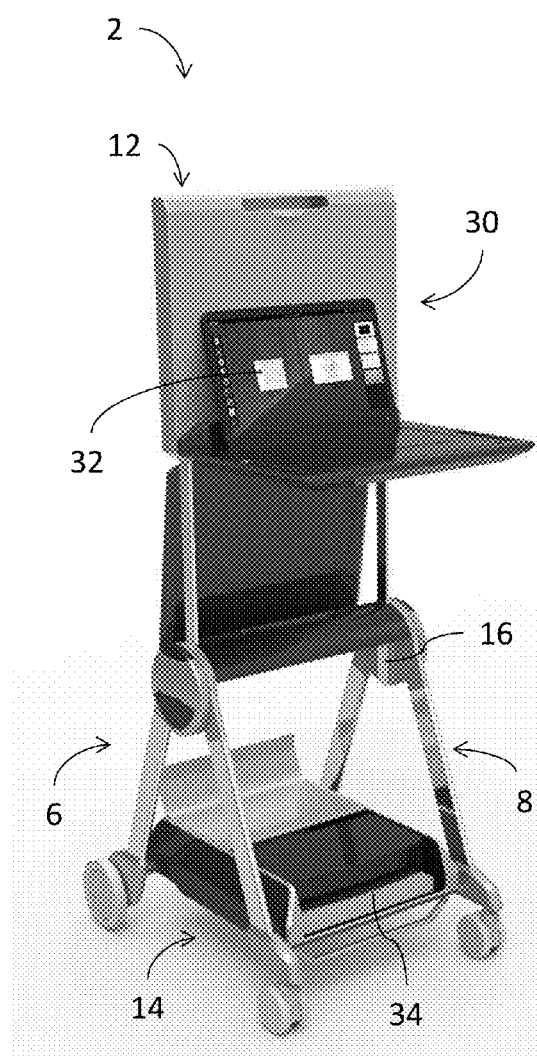
FIG. 3 illustrates a perspective front view of the cart in FIG. 1 expanded into a working mode with the module in FIG. 1 mounted on top and deployed as a workstation.
Figure 4:
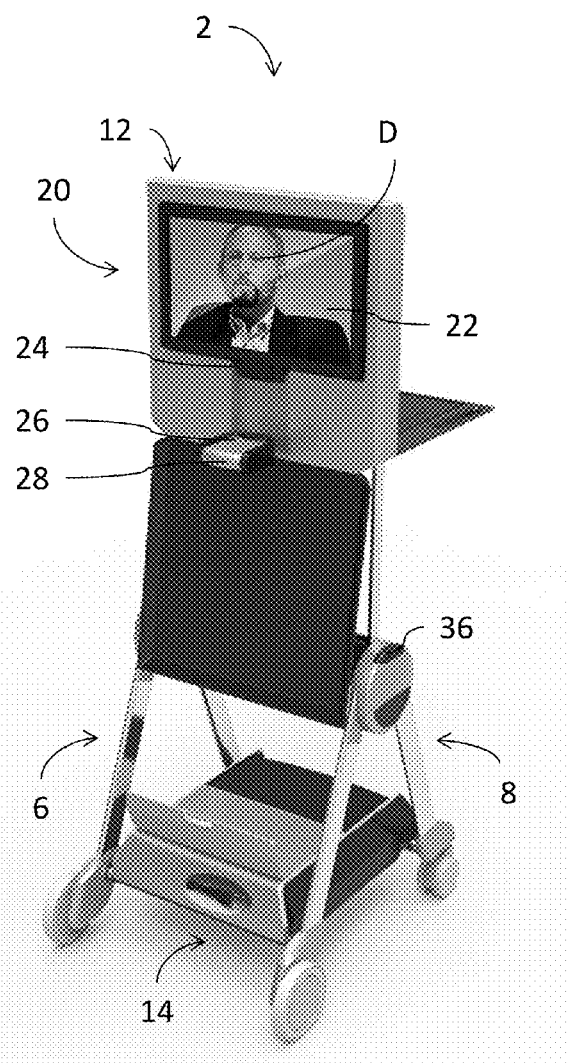
FIG. 4 illustrates a perspective rear view of the cart in FIG. 3.

The pair of support members 6, 8 are pivotable between a closed position (shown in FIGS. 1 and 2) and an open position (shown in FIGS. 3 and 4). A central upright frame 16 is configured to guide a strut member 18 from a retracted position (shown in FIG. 1) to an upright extended position (shown in FIG. 2). The strut member 18 is lockable in the upright extended position when the support members 6, 8 are in the open position, and the workstation module 12 is mountable to and dismountable from the strut member 18 (shown in FIGS. 3 and 4). The workstation module may have an interface assembly 20, including a display 22, a camera 24, a speaker 26, and a microphone 28 that enable the patient to communicate with a doctor D that is located remotely from the cart 2. The workstation module 12 may also include a caregiver workstation 30 for providing a workspace for a caregiver, such as a nurse, and for optionally connecting a computer 32 to the interface assembly 20.

The power module 14 may be mounted to the cart 2 and may be connected to the computer 32 and/or interface assembly 20 for providing power. The power module 14 may be enclosed in a case that also includes a printer 34, which may be in communication with the computer 32. The power module 14 may be pivotably mounted to the support member 8 to pivot from an upright position (shown in FIGS. 1 and 2) to a horizontal position (shown in FIGS. 3 and 4) in which the power module 14 straddles the support members 6, 8 to enhance stability and limit pivotal movement of the support members 6, 8.

The cart 2 may easily be collapsed by pivoting the power module 14 to the upright position, dismounting the workstation module 12, pivoting the support members 6, 8 together to the closed position, and retracting the strut member 18. The pivoting assembly 11 may be in an unlocked state when the support members 6, 8 are in the open position, which enables the support members 6, 8 to easily and quickly be pivoted to the closed position. In the closed position, the pivoting assembly 11 automatically locks with a locking mechanism (not shown) to restrict relative movement of the support members 6, 8, which enhances portability and storage. The pivoting assembly 11 may thereafter be unlocked by depressing a button 36. The workstation module 12 may be mounted to one of the support members 6 during transportation (as shown in FIG. 2), and wheels 38 at a lower end of the cart 2 may be used to transport the cart 2. As shown in FIG. 2, the strut member 18 may be configured as an extendable handle that facilitates pulling or pushing of the cart 2 on the wheels 38.

Figure 5:
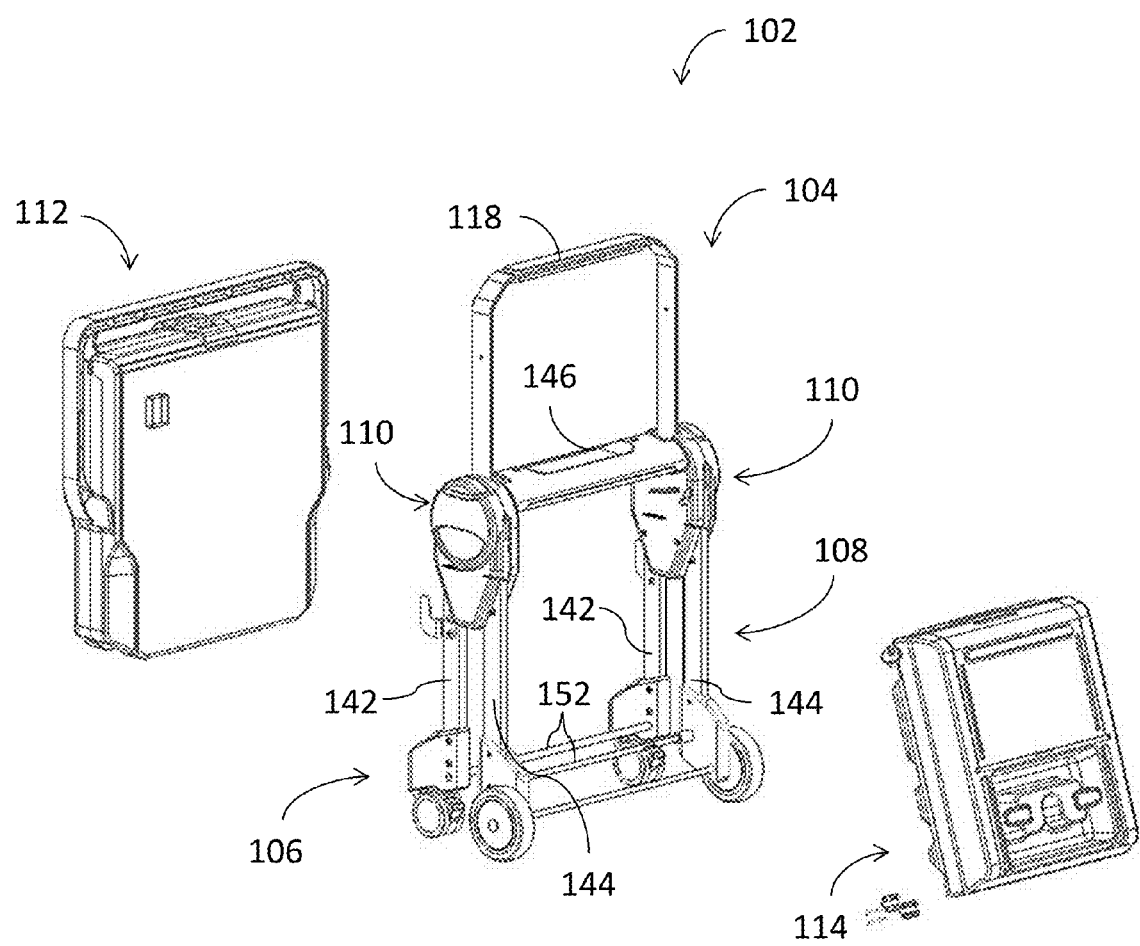
FIG. 5 illustrates an exploded perspective view of another exemplary cart system shown in a partially collapsed state.
Figure 6:
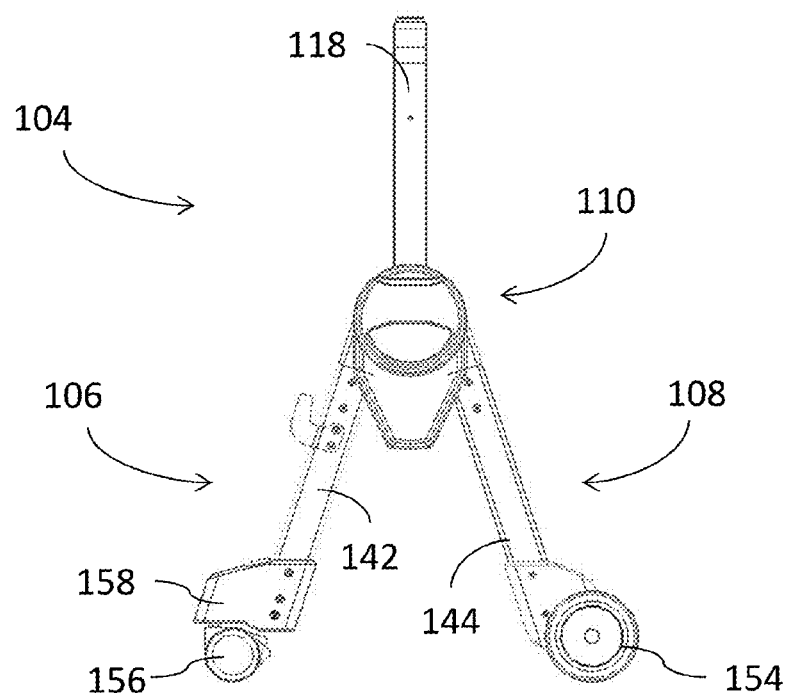
FIG. 6 illustrates a schematic side view of a frame of the cart in FIG. 5.
Figure 7:
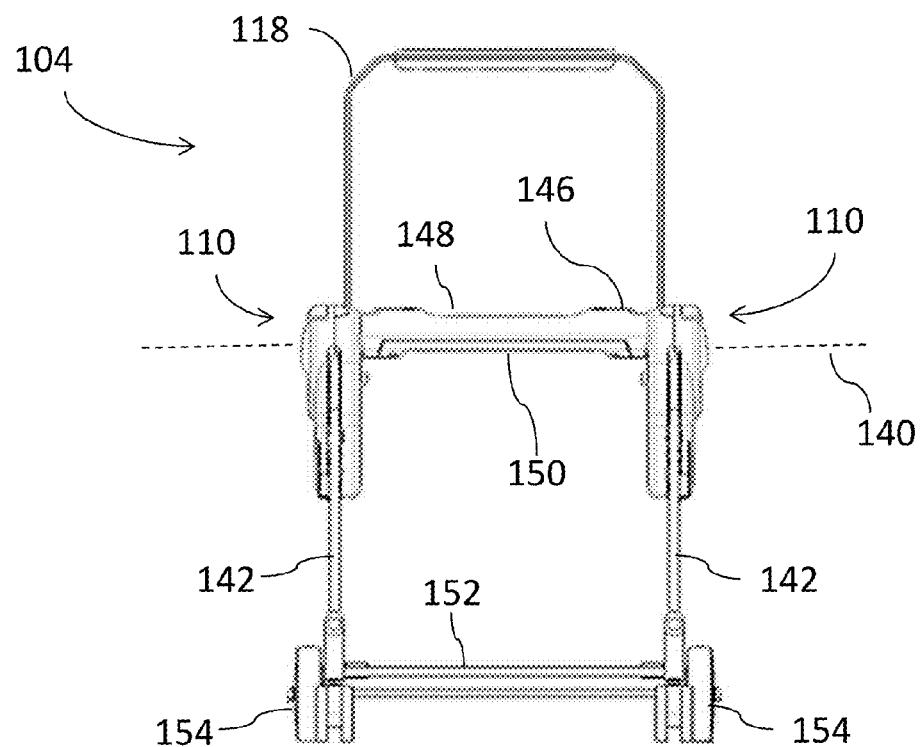
FIG. 7 illustrates a schematic front view of the frame in FIG. 6.
Figure 8:
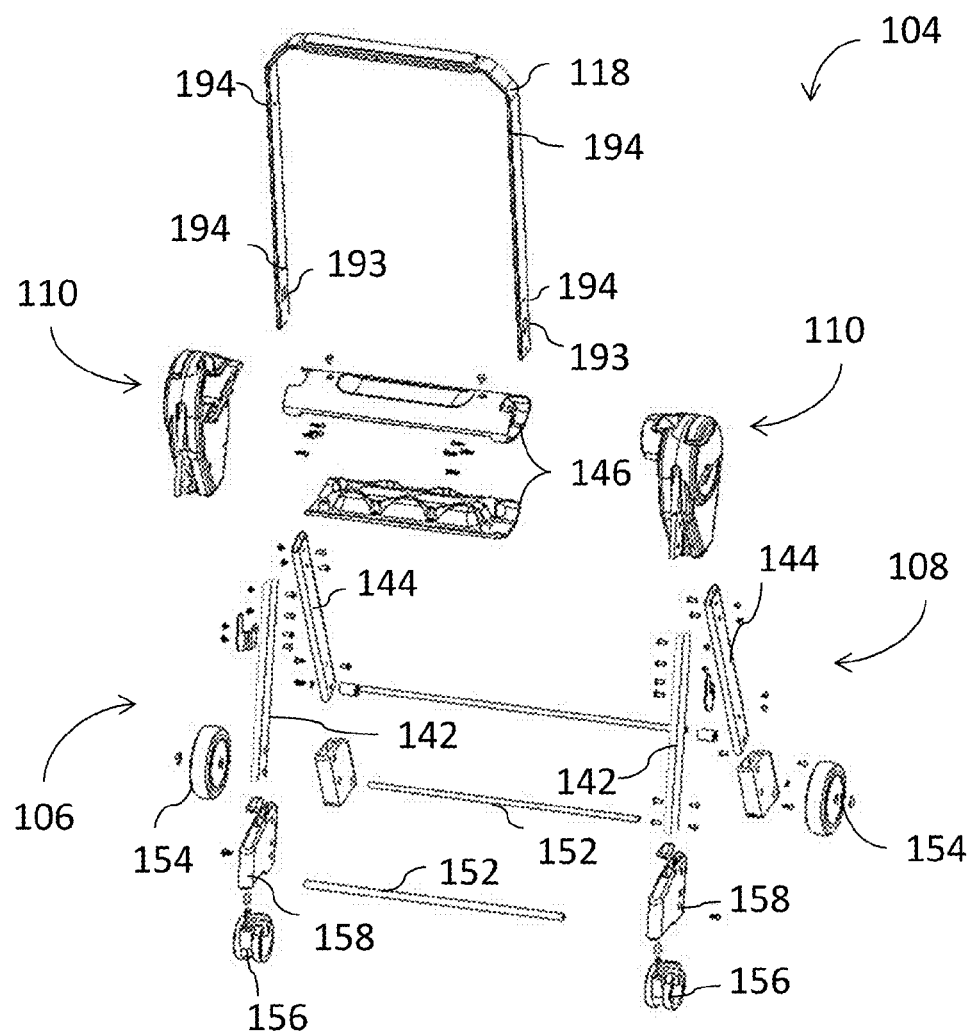
FIG. 8 illustrates an exploded perspective front view of the frame in FIG. 6.
Figure 9:
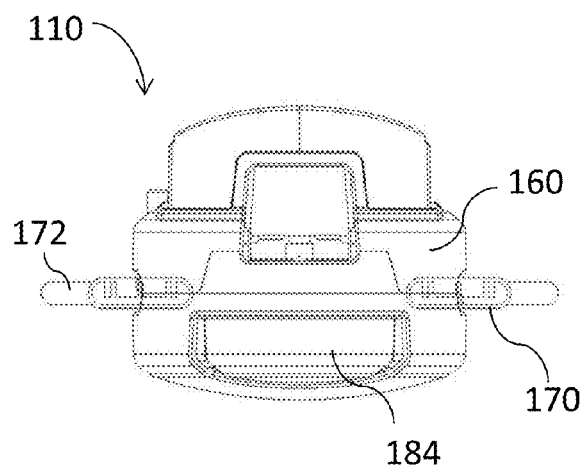
FIG. 9 illustrates a top plan view of a central frame assembly of the cart in FIG. 5.
Figure 10:
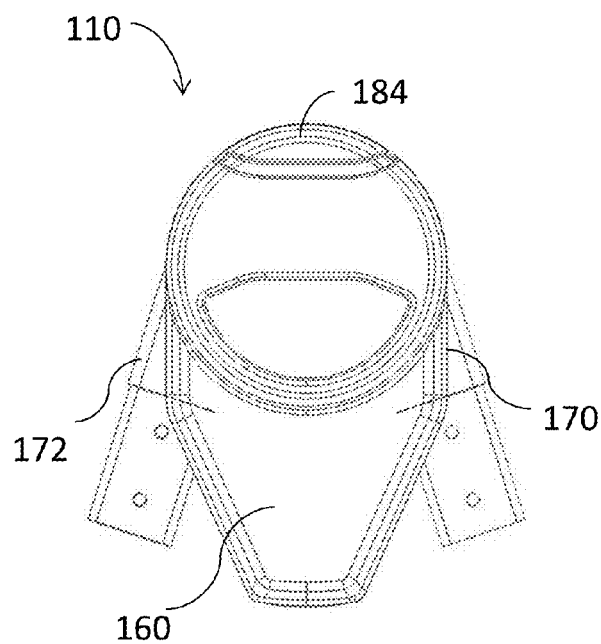
FIG. 10 illustrates a schematic side view of the central frame assembly in FIG. 9.
Figure 11:
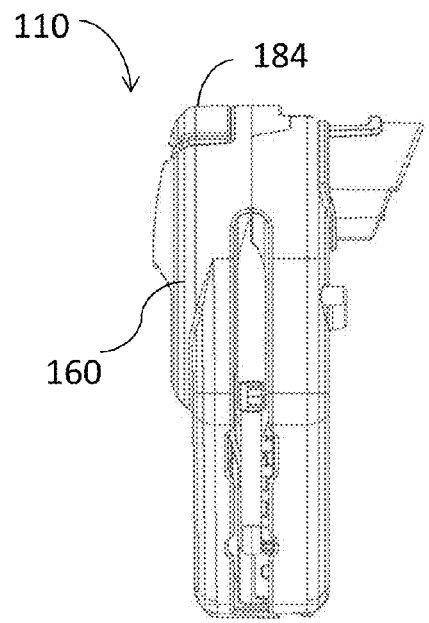
FIG. 11 illustrates a schematic front view of the central frame assembly in FIG. 9.

Turning now to FIG. 5, another exemplary embodiment of a portable cart system 102 is shown. The cart 102 is substantially the same as, or similar to, the above-referenced cart 2. In addition, the foregoing description of the cart 2 is equally applicable to the cart 102. Moreover, it will be appreciated upon reading and understanding the specification that aspects of the carts may be substituted for one another or used in conjunction with one another where applicable.

Referring to FIGS. 5-8, a frame assembly 104 of the cart 102 is described in detail. The frame assembly 104 includes collapsible support members 106 and 108, a central frame assembly 110, and an extendable strut member 118. The frame assembly 104 may be configured as an A-frame assembly with the pair of collapsible support members 106, 108 pivotable relative to each other about a common axis 140 between a closed position (shown in FIG. 5) and an open position (shown in FIG. 6). The central frame assembly 110 includes a pivoting assembly 164 (shown in FIG. 12) that operatively connects the respective support members 106, 108 for enabling pivoting of the support members 106, 108 between the closed position and the open position.

In the illustrated embodiment, the support members 106, 108 each include a pair of legs 142, 144 that are laterally spaced from each other. Two pairs of central frame assemblies 110 having pivoting assemblies (not shown) are also laterally spaced from each other to correspond with the respective legs 142, 144. A central cross-member 146 operatively connects the pair of central frame assemblies 110. The cross-member 146 may have an upper recess 148 for enabling a user to grip the strut member 118, and may also include a lower recess 150 for enabling a user to grip and lift the frame 104. Lateral braces 152 may also be provided at respective lower portions of the support members 106, 108 to improve stability and optionally provide mounting locations for modules 112 and 114, as will be described in further detail below. Wheels 154, 156 may be operatively connected at respective lower ends of the support members 106, 108. In the illustrated embodiment, wheels 154 are connected by an axle to one support member 108 to enhance linear movement, and casters 156 are connected to the opposite support member 106 to enhance swivability. The casters 156 may be connected to an inclined portion of a lower cap 158, such that the downward force of the frame 104 will orient the casters 156 into alignment with the legs 142 to improve stability, particularly in the closed position.

Turning to FIGS. 9-12, the central frame assembly 110 includes an outer shell 160 that encases the pivoting assembly 164, a central upright frame 162, and a locking mechanism 166. The central upright frame 162 has a hub portion 168 about which the pivoting assembly 164 rotates for enabling pivotal movement of the support members 106, 108 relative to the upright frame 162. In this manner, the pivoting assembly 164 is pivotably disposed in relation to the central upright frame 162, and the upright frame 162 may remain in the vertical position as the support members 106, 108 pivot between the open and closed positions.

Referring to FIGS. 12-15, the pivoting assembly 164 is described in further detail. The pivoting assembly 164 may be a hinge mechanism 164 having a pair of hinge plates 170, 172 that each rotate relative to each other about the common axis 140, for example, about the hub portion 168 provided by the upright frame 162. The hinge plates 170, 172 may be disposed axially adjacent to each other, and each hinge plate is operatively connected to respective support members 106, 108, for example, by fastening, adhering, and/or integrally forming. The hinge plates 170, 172 may have protrusions, such as legs, that are received by the respective support members 106, 108 for enabling the attachment thereof.

The hinge mechanism 164 may include lockable features configured to restrict relative movement of the hinge plates 170, 172, thereby limiting pivotal movement of the support members 106, 108. For example, each of the hinge plates 170, 172 may have a locking slot 174 radially spaced from the common axis, and each of the locking slots 174 may be configured to receive a locking pin 176. The locking pin 176 axially extends into the respective locking slots 174 and is radially moveable within the respective locking slots 174 for enabling the respective hinge plates 170, 172 to move relative to each other between a locked position (shown in FIG. 13) and an unlocked position (shown in FIG. 14).

Figure 13:
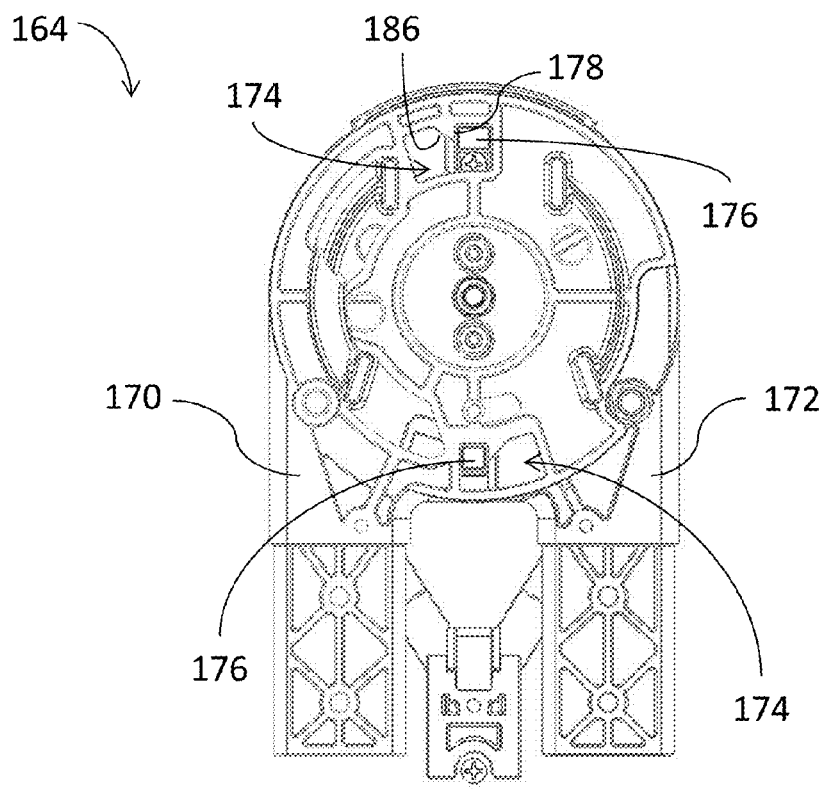
FIG. 13 illustrates a schematic side view of a pivoting assembly of the cart in FIG. 5 shown in a locked position.

Referring to FIG. 13, the locked position of the hinge plates 170, 172 may correspond with the closed position of the support members 106, 108 for restricting movement of the support members during storage or transportation of the frame 104. So as to effect a locked state of the hinge plates 170, 172 in the locked position, the respective locking slots 174 are each configured with a lock portion having a surface 178 for engaging the locking pin 176. The lock portion surface 178 is a radially extending surface configured to engage a side of the locking pin 176 perpendicular to the radial (e.g., up and down) direction of the locking pin 176, such that the locking pin 176 does not disengage from the lock portion surface 178. The lock portion of the locking slot 174 may include parallel lock portion surfaces that form a radial slot portion configured to receive the locking pin 176 and limit rotational movement of the hinge plates 170, 172 in either direction.

Figure 12:
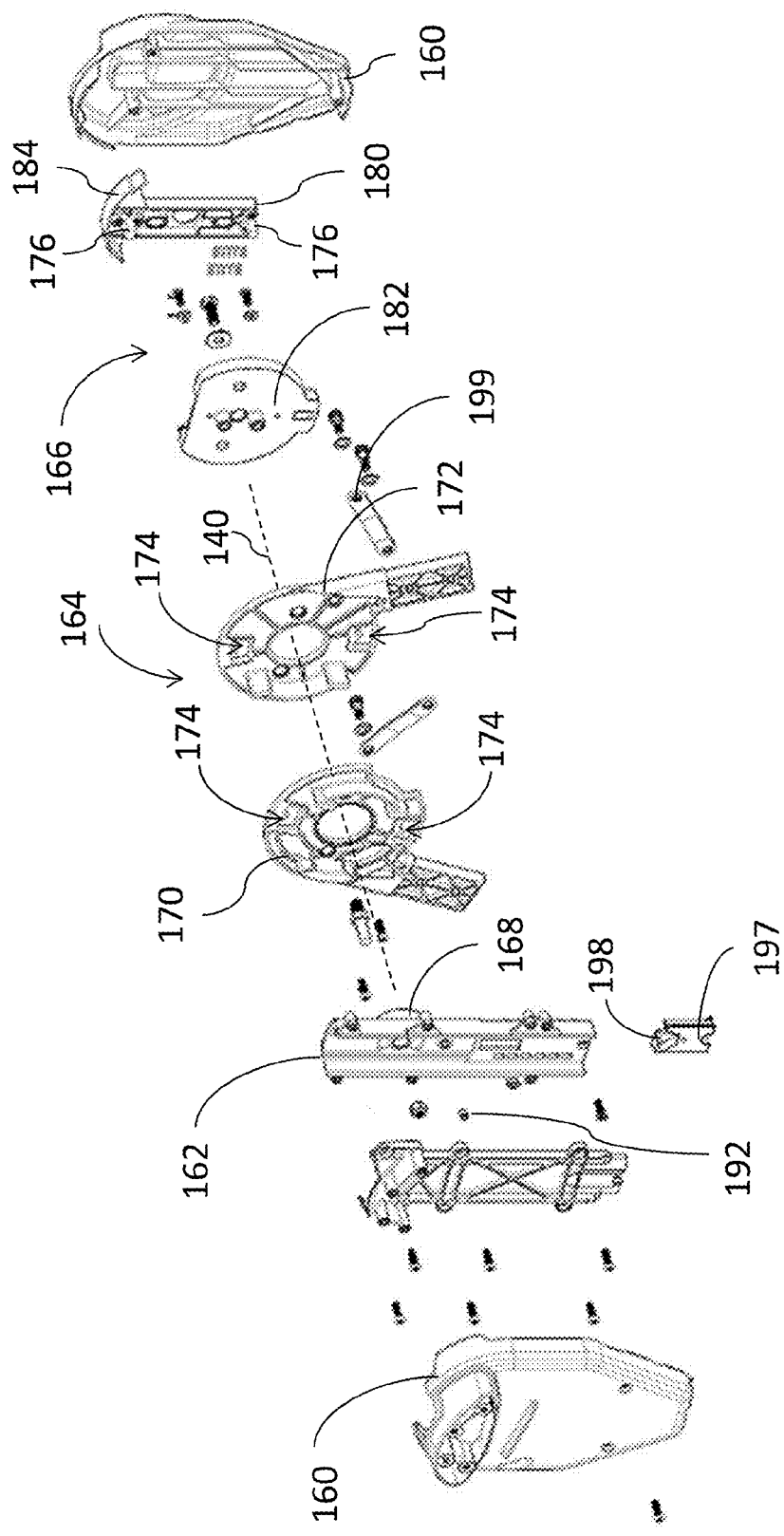
FIG. 12 illustrates an exploded perspective view of the central frame assembly in FIG. 9.
Figure 15:
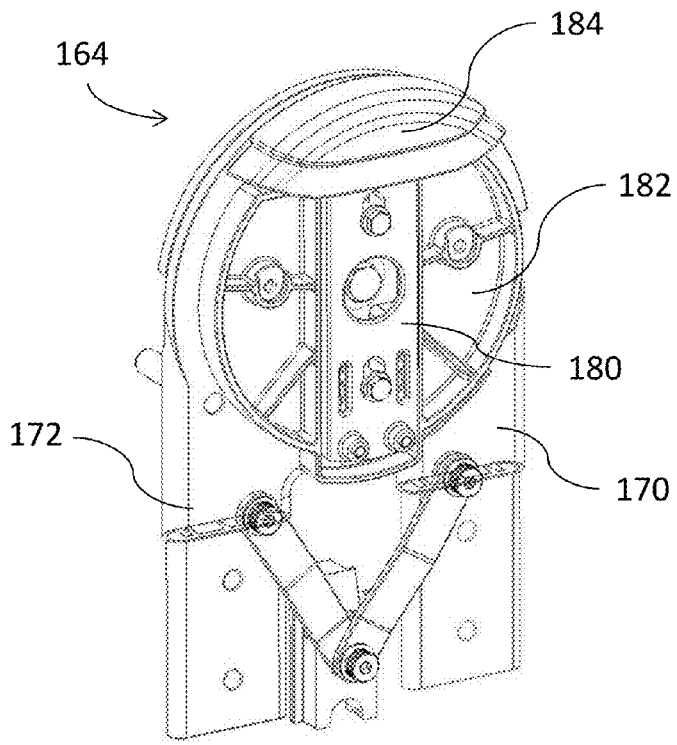
FIG. 15 illustrates a perspective side view of a locking mechanism of the pivoting assembly in FIG. 13 when the pivoting assembly is in the locked position and a sliding assembly is in the downward position.

Referring to FIGS. 12 and 15, the locking pin 176 may be operatively connected to a lock slide 180. The locking pin 176 extends away from the lock slide 180 in the axial direction to extend through the respective locking slots 174 of the hinge plates 170 and 172. The lock slide 180 is received within a groove of a lock plate 182, and the lock slide 180 is moveable within the groove in the radial (e.g. up/down) direction for effecting radial movement of the locking pin 176. The lock plate 182 may be operatively connected to the central upright frame 162 to prevent rotational movement of the lock plate 182 and lock slide 180. The lock slide 180 may be spring biased in the radially outward direction (e.g., upward), such that the locking pin 176 engages the locking slots 174 and automatically locks the hinge mechanism 164 when the support members 106, 108 are moved to the closed position.

The upper portion of the lock slide 180 may be configured as a button 184 that is accessible through an opening in the shell 160, and the hinge mechanism 164 may be unlocked by depressing the button 184. In this manner, when the button is depressed, the radially outward spring bias force of the lock slide 180 is overcome, and the lock slide 180 and locking pin 176 are moved in the radially inward direction (e.g., downward) to disengage from the respective lock portion surfaces 178. The locking pin 176 may be moved to a radially inward transition portion of the respective locking slots 174 to permit relative movement of the hinge plates 170, 172 to an unlocked position.

Figure 14:
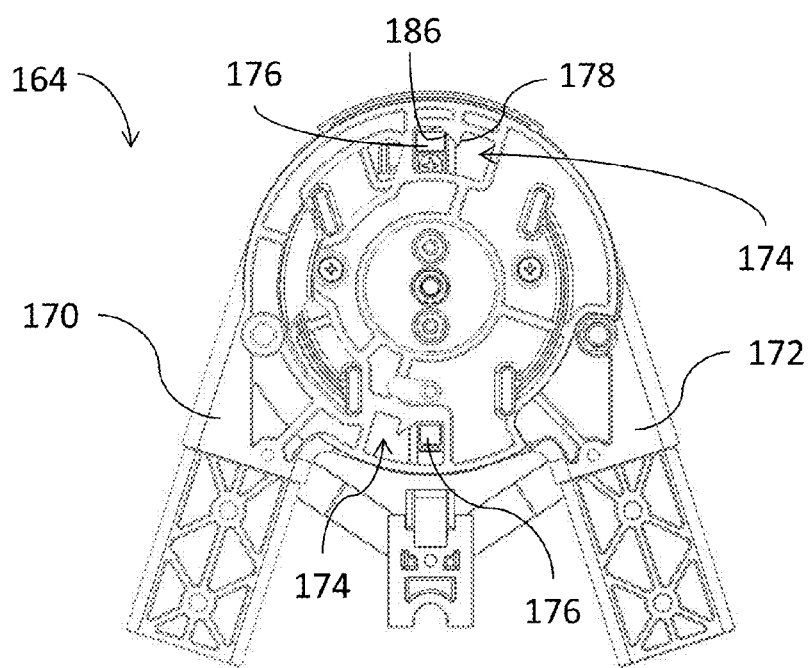
FIG. 14 illustrates a schematic side view of the pivoting assembly in FIG. 13 shown in an unlocked position.

Referring to FIG. 14, the unlocked position of the hinge plates 170, 172 may correspond with the open position of the support members 106, 108, such that the support members 106, 108 may easily and quickly be pivoted toward the closed position, whereby the hinge mechanism 164 automatically locks in the manner described above. So as to effect an unlocked state in the unlocked position, the respective locking slots 174 may each be configured with an unlock portion having a surface 186 for engaging the locking pin 176 in a manner that enables radial (e.g. up/down) movement of the locking pin 176. In the illustrated embodiment, the unlock portion surface 186 is configured as a ramped surface (e.g., sloped with respect to the radially extending lock portion surface 178) that is adapted to engage and radially move the locking pin 176 down the ramped surface 186 in response to the rotation movement of the hinge plates 170, 172 toward the locked position.

The ramped surface 186 of the unlock portion may be configured at such an angle that rotational forces of the hinge plates 170, 172 acting on the locking pin 176 may be sufficient to overcome the spring bias force of the lock slide 180, thereby enabling the locking pin 176 to automatically move in response to the forces acting on it. For example, if the frame 104 is lifted by the central frame assembly 110 as the support members 106, 108 are in the open position, the weight of the support members 106, 108 generates a moment of force at the hinge plates 170, 172 that acts on the locking pin 176 at the respective ramped surface 186 interfaces. If the force acting on the locking pin 176 is sufficient to overcome the lock slide 180 spring bias, the locking pin 176 will move radially inward (e.g., down the ramped surface 186), and the hinge plates 170, 172 will rotate towards the locked position. As the hinge plates 170, 172 continue to rotate toward the locked position, the support members 106, 108 move closer together and the moment of force at the hinge plates is reduced. When the support members 106, 108 are pivoted to the closed position, the lock portions of the respective locking slots 174 align as the locking pin 176 transitions over to the lock portion of the locking slots 174. In the closed position, the moment acting on the hinge plates 170, 172 is minimal because the support members 170, 172 are close together, and the spring bias of the lock slide 180 forces the locking pin 176 radially outward (e.g., upward) into the radially extending lock portion of the respective locking slots 174, thereby automatically locking the hinge mechanism 164. Providing a hinge mechanism with such action allows the unlocked and opened frame 104 to easily be closed and automatically locked for quick transportation of the cart 102.

The forces acting on the locking pin 176 may be reduced by distributing the force over a plurality of locking pins 176. In this manner, a plurality of locking slots 174 radially spaced in each hinge plate 170 and 172 are each configured for receiving a respective locking pin 176. It should be understood that the configuration of the locking slots 174 and locking pins 176 is but one of many ways in which the pivoting assembly 174 may be selectively locked or unlocked. For example, the locking pin may be configured as a round pin, may be axially moveable to engage the hinge plates instead of radially moveable, may be disposed between hinge plates and extend into the locking slots on either side of the locking pin, may engage the outer edge of the hinge plates in a locking pawl manner, etc. In addition, the locking mechanism may be a selective on/off mechanism and not automatic, and the pivoting assembly may lock in both the open and closed position, or optionally may not lock at all.

Figure 16:
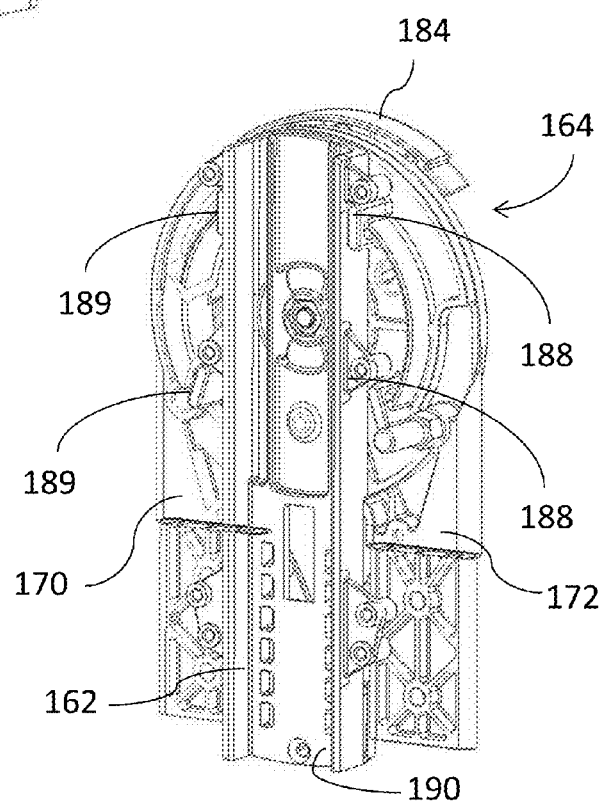
FIG. 16 illustrates a perspective side view of a central upright frame of the cart in FIG. 5 shown in relation to the pivoting assembly in FIG. 13 when the pivoting assembly is in the locked position and the sliding assembly is in the downward position.
Figure 17:
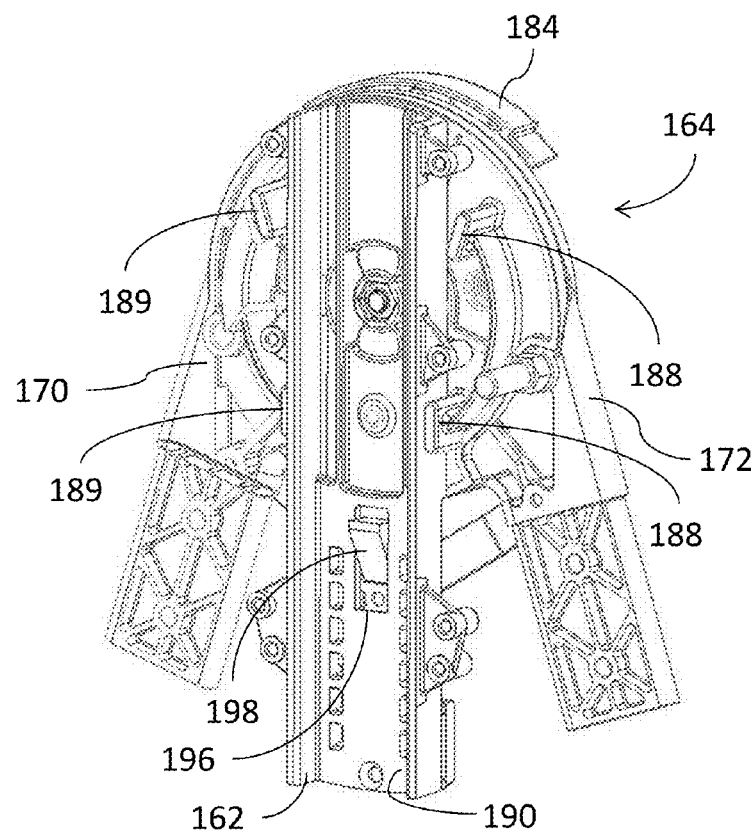
FIG. 17 illustrates a perspective side view of the central upright frame of FIG. 16 when the pivoting assembly is in the unlocked position and the sliding assembly is in the upward position.
Figure 18:
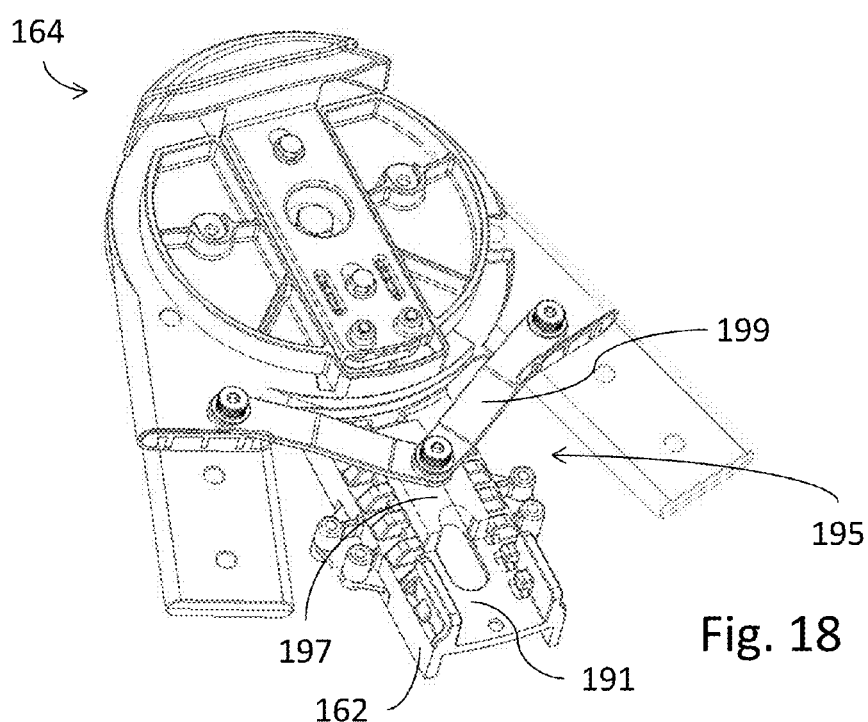
FIG. 18 illustrates a perspective side view of the pivoting assembly in FIG. 15 when the pivoting assembly is in the unlocked position and the sliding assembly is in the upward position.
Figure 19:
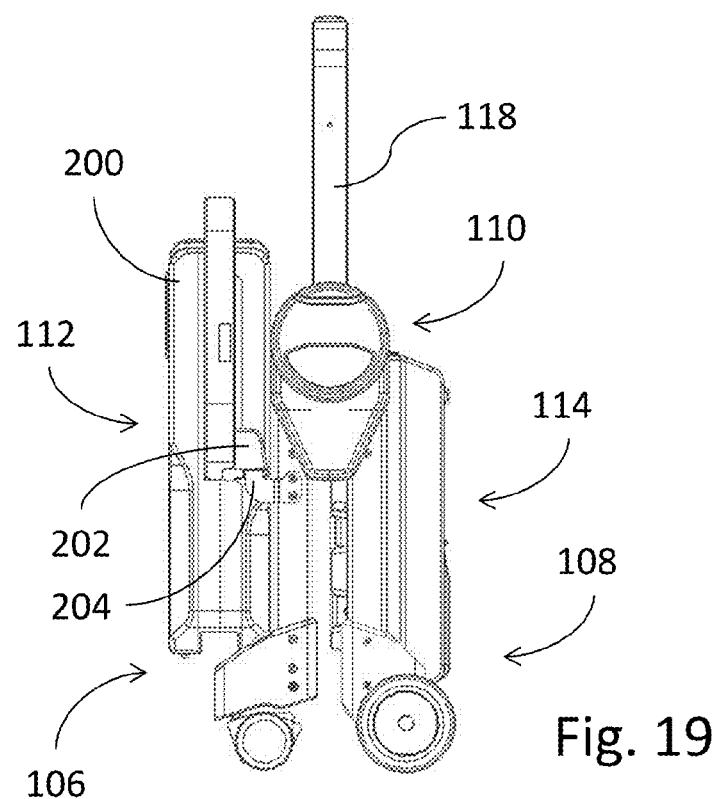
FIG. 19 illustrates a schematic side view of the cart in FIG. 5 shown in a partially collapsed state with the module mounted.

Referring now to FIGS. 16-18, the central upright frame 162 is shown in relation to the pivoting assembly 164. As discussed above, the central upright frame 162 has a hub portion 168 about which the pivoting assembly 164 rotates for enabling pivotal movement of the support members 106, 108 relative to the upright frame 162. In this manner, the upright frame 162 may remain in the vertical position as the support members 106, 108 pivot between the open and closed positions. So as to further limit movement of the upright frame 162, the respective hinge plates 170, 172 may each include a pair of holding tabs 188, 189 configured to extend axially inwardly to engage the upright frame 162. To provide such an engagement, the inner hinge plate 170 may include apertures for interlockingly receiving the respective holding tabs 189 of the outer hinge plate 172. The respective holding tabs 188, 189 may include upper and lower holding tabs that are configured to engage the upright frame 162 in a scissoring action, which limits movement of the upright frame 162 relative to the hinge plates 170, 172 when the support members 106, 108 are in either the open or closed position.

The central upright frame 162 also includes a groove 190 in which the strut member 118 (shown in FIG. 12) is slidably disposed. The upright frame 162 is configured to guide the strut member 118 between a retracted position and an extended upright position. The upright frame 162 may also include a spring biased detent 192 configured to be received by detent recesses 194 in the strut member 118 (shown in FIG. 8) for selectively maintaining the strut member 118 in the extended position or the retracted position. For example, the spring biased detent 192 may be received by the upper detent recess 194 when the strut member 118 is in the retracted position, or the detent 192 may be received by the lower detent recess 194 when the strut member 118 is in the extended position. In this way, the strut member 118 may be maintained in the retracted or extended position until a force is exerted on the strut member 118 to overcome the spring force of the detent 192. This may be beneficial when the strut member 118 is configured as a handle, such as the u-shaped handle shown in FIG. 8, and the user may easily grasp the handle maintained in the extended position to transport the collapsed cart 102.

Still referring to FIGS. 16-18, the central assembly 110 also includes a slider assembly 195 configured to lockingly engage the extended upright strut member 118 when the support members 106, 108 are in the open position. The slider assembly 195 includes a slider mechanism 197 operatively connected to a linkage 199, and the linkage 199 is operatively connected to the respective support members 106, 108 and/or the respective hinge plates 170, 172. The slider mechanism 197 is slidably disposed within a guide slot 191 of the upright frame 162, and the slider mechanism 197 is slidably moveable via the linkage 199 between an upward position and a downward position in response to the support members 106, 108 respectively pivoting between the open position and the closed position. In this manner, the interaction of the slider assembly 195 within the guide slot 191 of the upright frame 162 may also assist in enabling the upright frame 162 to remain vertical as the support members 106, 108 pivot between the open and closed positions.

In the illustrated embodiment, the slider mechanism 197 includes a spring biased pawl 198 that is moveable between a retracted position (shown in FIG. 16) and an engaging position (shown in FIG. 17). The spring biased pawl 198 may be hingedly connected to the slider mechanism 197, and is normally biased toward the engaging position. When the support members 106 and 108 are pivotably disposed toward the closed position, the slider mechanism 197 is slidably disposed toward the downward position, and the spring biased pawl 198 engages a back guiding surface of the guide slot 191, which forces the pawl 198 toward the retracted position. Thus, when the support members 106, 108 are in the closed position, the strut member 118 may be freely extended and retracted, optionally engaging the detents 192, but the strut member 118 is not locked into place by the retracted pawl 198. This is a safety feature of the cart 102, such that when the support members 106, 108 are in the closed position, the cart 102 is in an unstable position and a weighted object (such as the module 112) placed on the strut 118 would force the unlocked strut member 118 to retract (for example, if the weight is sufficient to overcome the detent spring bias), thereby alerting the user that the support members 106, 108 are closed and unstable.

On the other hand, when the support members 106, 108 are pivotably disposed toward the open position, the slider mechanism 197 is slidably disposed toward the upward position, and the spring biased pawl 198 extends through an opening 196 in the back guiding surface of the guide slot 191. When the strut member 118 is in the retracted (e.g., downward) position, the pawl 198 extending through the opening 196 engages the side of the strut member in a non-locking manner. However, when the strut member 118 is extended upwardly, an opening 193 in the strut member 118 aligns with the upright frame opening 196 through which the pawl 198 extends, and the pawl 198 lockingly engages the strut member 118 by extending into the strut opening 193. As such, when the cart 102 is in the open and more stable position, the strut member 118 may be locked in place when extended, enabling a weighted object, such as the module 112, to be stably supported by the frame 104. To disengage the pawl 198 and retract the strut 118, the support members 106, 108 may be pivoted back toward the closed position, whereby the slider mechanism 197 will slide down the guide slot 191 and the spring biased pawl 198 will be retracted by engaging the back guiding surface of the guide slot 191.

Figure 20:
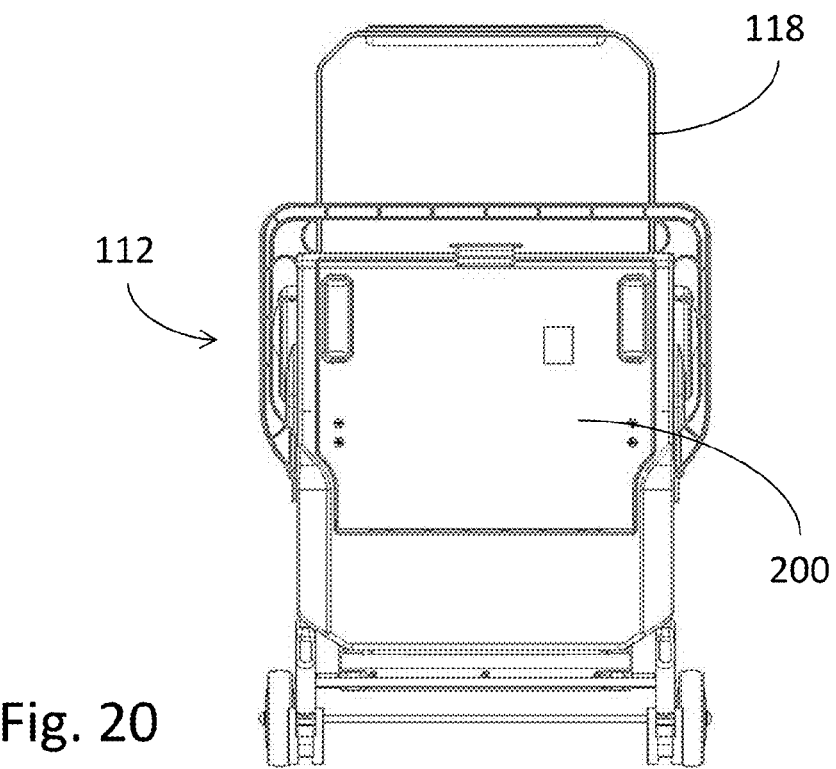
FIG. 20 illustrates a schematic front view of the cart in FIG. 19.
Figure 21:
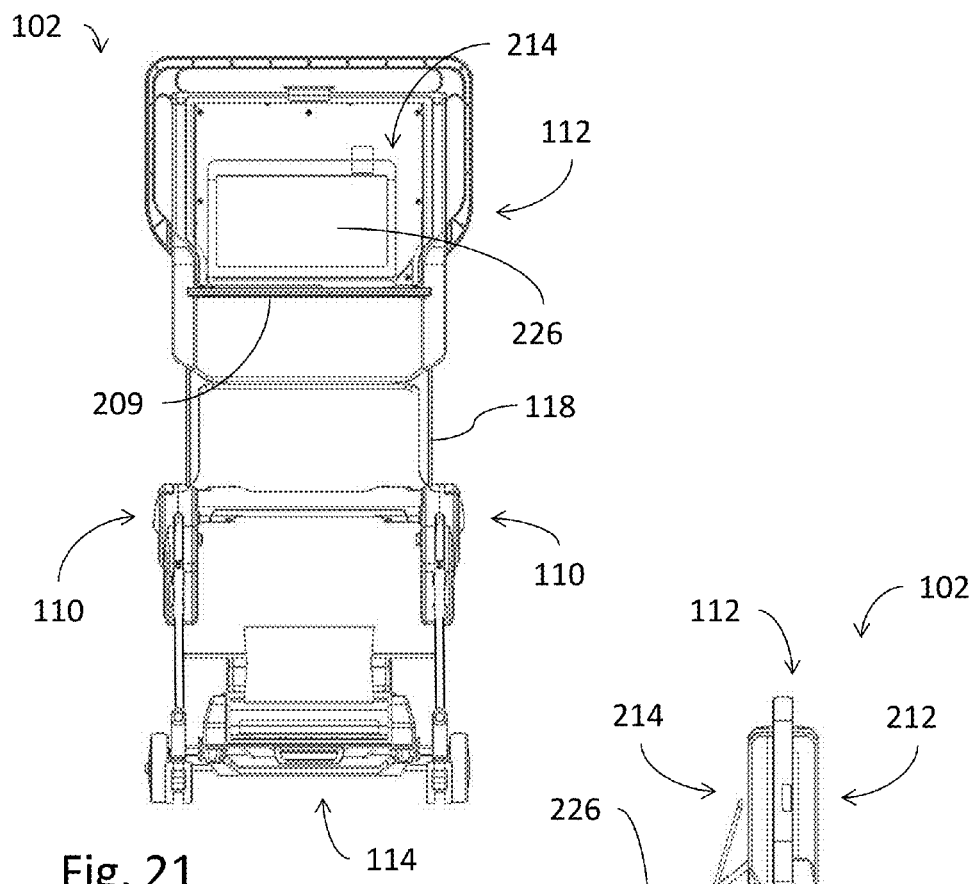
FIG. 21 illustrates a schematic front view of the cart in FIG. 5 shown in an expanded working mode with the module deployed as a workstation.

Turning now to FIGS. 19-26, the workstation module 112 will be described in further detail. As shown in FIGS. 20 and 21, the workstation module 112 may be enclosed within a case 200 configured to mount to and dismount from the support member 106, which enhances portability when the cart 102 is collapsed into a transportation or storage mode. The workstation module 112 may include latches 202, clasps, or similar attachment means that engage with respective hooks 204, studs, or similar attachment means on the support member 106 for easily mounting and dismounting the workstation module 112.

Figure 22:
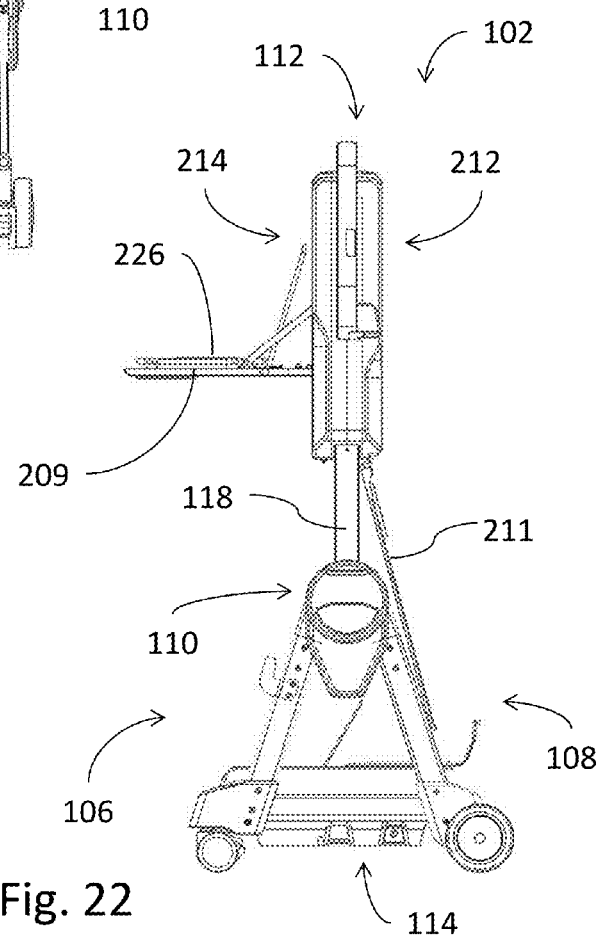
FIG. 22 illustrates a schematic side view of the cart in FIG. 21.
Figure 23:
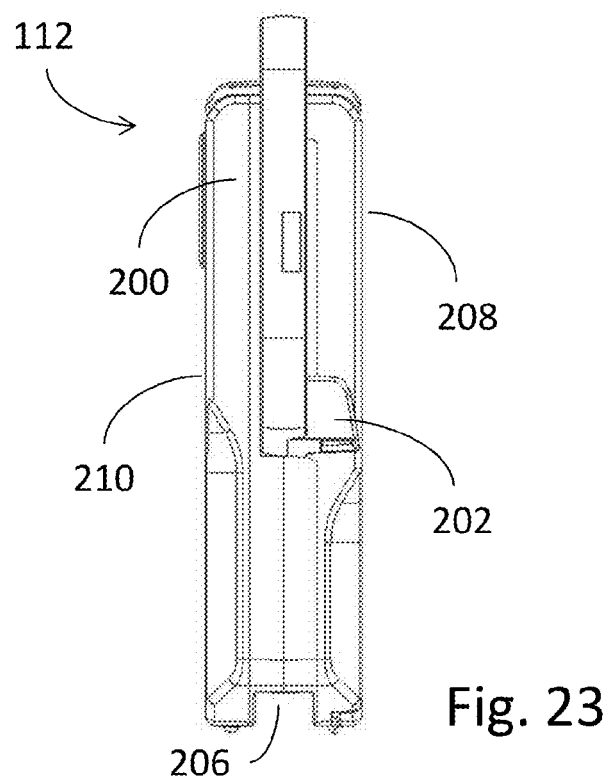
FIG. 23 illustrates a schematic side view of a workstation module of the cart in FIG. 5.
Figure 24:
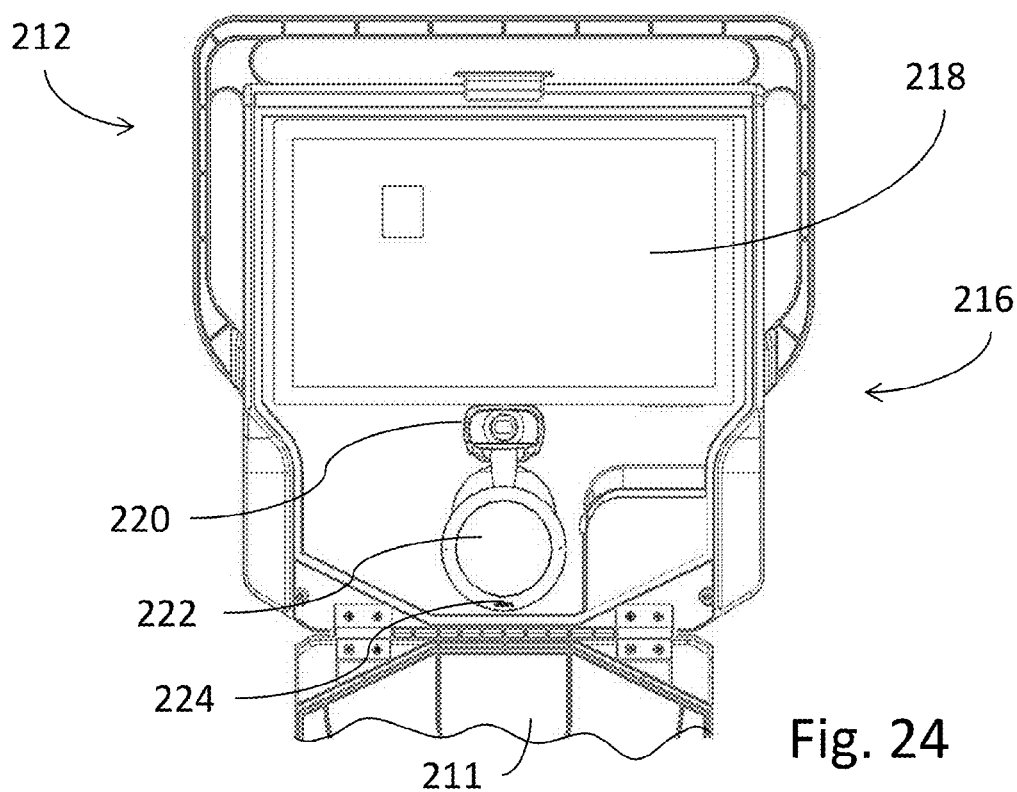
FIG. 24 illustrates a schematic front view of the workstation module in FIG. 23 with the door opened.
Figure 25:
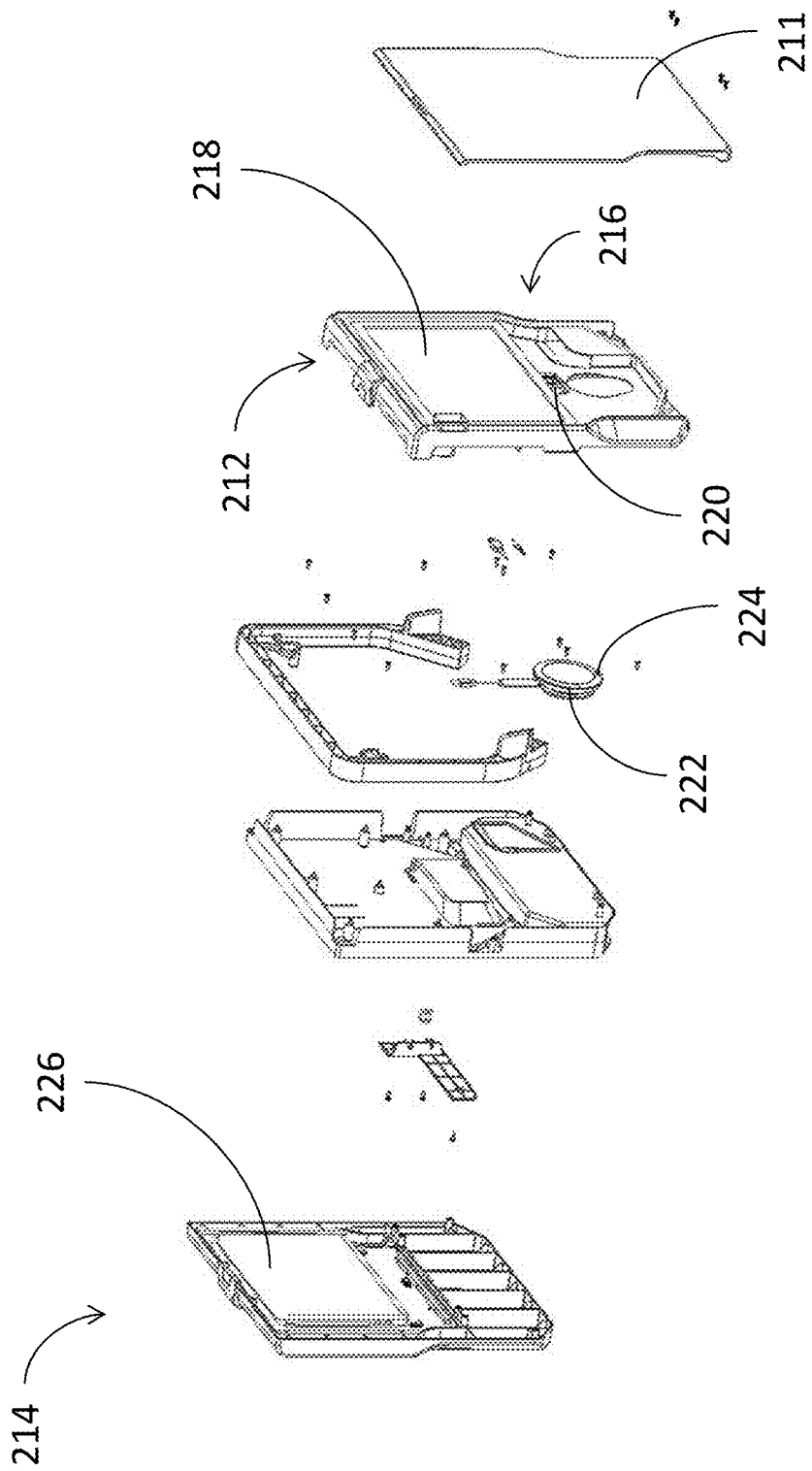
FIG. 25 illustrates an exploded perspective view of the workstation module in FIG. 23.

Referring to FIGS. 21-23, the workstation module 112 is also configured to mount to and dismount from the strut member 118 when the strut member 118 is in the upright extended and locked position, as discussed above. One way to mount the workstation module 112 to the strut member 118 is to include a recessed portion 206 in the case 200 for receiving an upper portion of the strut member 118. The recessed portion 206 may be sufficiently sized to receive and stably support the workstation module 112 (e.g., sized with a sufficient width to receive the width of the strut member 118, and sized sufficiently deep to provide adequate support). The illustrated embodiment is one example of mounting the workstation module 112 to the strut 118, however, a variety of other ways are possible, for example, using the latches 202 to engage respective hooks or studs on the strut member 118, among others.

Referring to FIGS. 21-25, the workstation module 112 may have a first side 208 and an opposite second side 210. Each of the sides 208, 210 may have respective doors 209, 211, closeable with a latch, for protecting or accessing first and second workstations 212, 214 on the respective first 208 and second 210 sides. The first workstation 212 may be a patient workstation having an interface assembly 216 including a display 218, a camera 220, a speaker 222, and a microphone 224. The speaker 222 and microphone 224 may be combined into a single unit, which is mountable to and dismountable from the first workstation 212 for facilitating hearing or speaking by the patient, for example, if the patient is elderly or bedridden. The camera 222 may be swivable on the workstation 212 for aiming the camera 222 at the patient, for example, if the patient is lying in bed.

The second workstation 214 may be a caregiver workstation for facilitating the work of the caregiver that is located with the patient. The door 209 of the second workstation 214 may be hingedly connected to the workstation module 112 and deployable from a closed position to an open position to form a workstation platform, such as a tray. The tray may be positioned essentially parallel to the ground upon which the support members are positioned, or the platform may be angled, such as at discrete angles relative to the ground.

The caregiver workstation 214 may include a computer 226, such as a laptop, connected to the interface assembly 216. The caregiver workstation may optionally include cables, such as power cables, USB cables, and the like, for connecting the computer 226 to the interface assembly 216. The computer 226 may optionally be detachable from the workstation module 112 and/or deployable in a wireless configuration to communicate with the interface assembly 216 via a wireless communication interface. In some embodiments, the interface assembly 216 may include a separate computer for operating the interface assembly 216.

Figure 26:
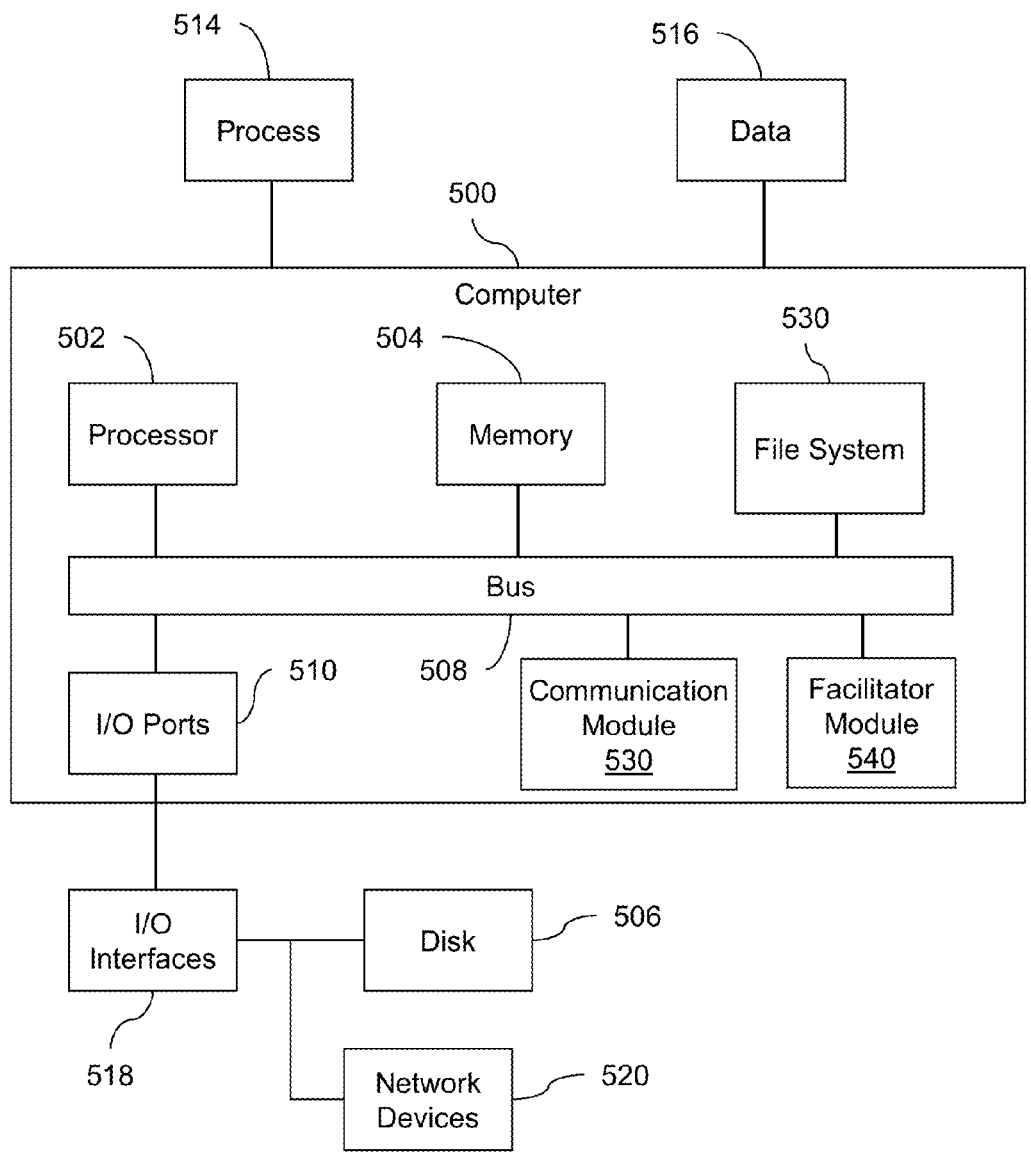
FIG. 26 illustrates a schematic diagram of a computer environment of the cart in FIG. 5.
Figure 27:
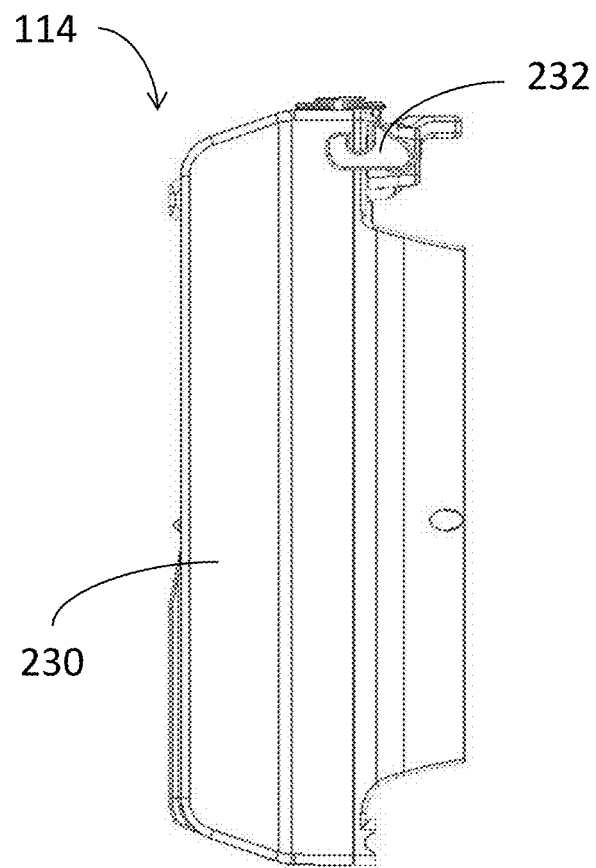
FIG. 27 illustrates a schematic side view of a power module of the cart in FIG. 5.
Figure 28:
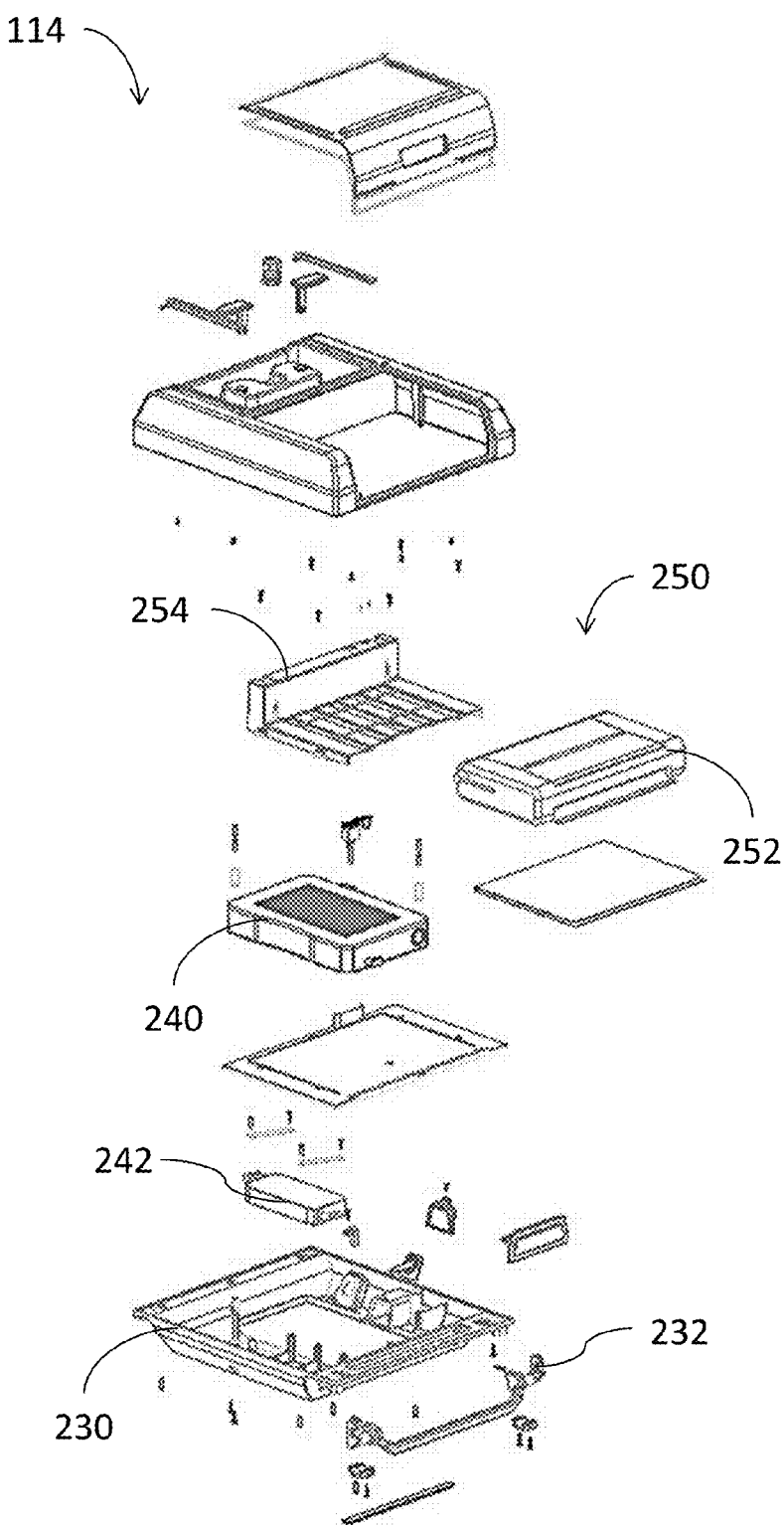
FIG. 28 illustrates an exploded perspective view of the power module in FIG. 27.

FIG. 26 illustrates a computer 500 that includes a processor 502, a memory 504, and I/O Ports 510 operably connected by a bus 508. In one embodiment, the computer 500 of FIG. 26 corresponds to the computer for operating the interface assembly 216 described above. In another embodiment, the computer 500 of FIG. 26 corresponds to the computer 226 described above. In yet another embodiment, the computer 500 may correspond to the computer for operating the interface assembly 216, which communicates with another computer, such as the computer 226.

In one example, the computer 500 may include a communication module 530 configured to receive a video and audio communication corresponding to a transmission from a doctor at a location remote from a location of the cart 102, and further configured to cause the video to show on the display 218 and the audio to play through the speaker 222, the doctor/patient communication module further configured to receive a video image from the camera 220 and sound from the microphone 224 and to transmit the video image and the sound to the location remote from the location of the cart 102.

In one example, the computer 500 may include a facilitator module 540 configured to receive the video and audio communication corresponding to the transmission from the doctor and to cause the video to show on the display 218. In another example, the facilitator module 540 may further be configured to receive the video image from the camera 220 and sound from the microphone 224 and to cause the video image to show on a display of the computer 226 or another display on the second workstation 214, such that the caregiver may monitor communication between doctor and patient. In yet another example, the facilitator module 540 may further be configured to receive data corresponding to medical forms corresponding to at least one of the doctor or the patient and to show the data corresponding to medical forms on the display of the computer 226 such that the caregiver may assist in completing the medical forms.

The processor 502 can be a variety of various processors including dual microprocessor and other multi-processor architectures. The memory 504 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 506 may be operably connected to the computer 500 via, for example, an I/O Interfaces (e.g., card, device) 518 and an I/O Ports 510. The disk 506 can include, but is not limited to, devices like a magnetic disk drive, a solid state disk drive, a floppy disk drive, a tape drive, a Zip drive, a flash memory card, or a memory stick. Furthermore, the disk 506 can include optical drives like a CD-ROM, a CD recordable drive (CD-R drive), a CD rewriteable drive (CD-RW drive), or a digital video ROM drive (DVD ROM). The memory 504 can store processes 514 or data 516, for example. The disk 506 or memory 504 can store an operating system that controls and allocates resources of the computer 500.

The bus 508 can be a single internal bus interconnect architecture or other bus or mesh architectures. While a single bus is illustrated, it is to be appreciated that computer 500 may communicate with various devices, logics, and peripherals using other busses that are not illustrated (e.g., PCIE, SATA, Infiniband, 1394, USB, Ethernet). The bus 508 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The computer 500 may interact with input/output devices via I/O Interfaces 518 and I/O Ports 510. Input/output devices can include, but are not limited to, the display 218, the speaker 222, the camera 220, the microphone 224, another computer (e.g., 226), a keyboard, a microphone, a pointing and selection device, cameras, video cards, displays, disk 506, network devices 520, and the like. The I/O Ports 510 can include but are not limited to, serial ports, parallel ports, and USB ports.

The computer 500 can operate in a network environment and thus may be connected to network devices 520 via the I/O Interfaces 518, or the I/O Ports 510. Through the network devices 520, the computer 500 may interact with a network. Through the network, the computer 500 may be logically connected to remote computers. The networks with which the computer 500 may interact include, but are not limited to, a local area network (LAN), a wide area network (WAN), and other networks. The network devices 520 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 520 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

Turning to FIGS. 19-28 another module 114 is shown mounted to the support member 108. In the illustrated embodiment, the module 114 is a power module including a power source for providing power to the workstation module 112, for example, providing power to the interface assembly 216, the computer 226, and/or the computer 500. The power module 114 may be enclosed within a case 230 pivotably mounted to the support member 108. The power module 114 is pivotable between an upright storage position (shown in FIG. 19) and a horizontal working position (shown in FIG. 22), in which the power module 114 straddles the support members 106, 108 across respective lateral braces 152. The straddling of the power module 114 across the respective support members 106, 108 may provide a locking effect that restricts the support members 106, 108 from pivoting to the closed position while the cart 102 is deployed in the working mode.

The power module 114 includes latches 232 that engage respective pins on the support member 108 when the power module 114 is in the upright storage position. The pins on the support member 108 may extend through the shell 160, and the pins move relative to the shell 160 in an arcuate path through an arcuate groove in the shell 160, which accommodates the pivoting path of the support member 108 relative to the shell 106. It should also be understood that the module 114 may be mountable to or dismountable from the support member 108 in a manner similar to the workstation module 112, described above. Optionally or additionally, the module 114 may be used for storage of medical supplies, or the like.

The power source of the power module 114 may include a battery 240, which may be connected by cords to power the various components of the cart 102. The power module 114 may also include a cord that may be used to connect to a power outlet to recharge the battery 240. To increase battery life and minimize the weight of the cart 102, among other considerations, a main AC-DC converter 242 may be provided for charging the battery 240. The power module 114 may include a visual indicator for indicating the battery life.

The power module 114 may also include a power cord reel such that, in the transporting configuration, the power cord is reelable and does not interfere with transporting of the cart 102.

In the illustrated embodiment, the power module 114 includes a printer assembly 250 having a printer 252, a paper tray 254, and other associated components. The printer 252 may be configured to communicate with the computer 226, such as via cables or wirelessly. The various devices of the cart 102 including the display 218, the speaker 222, the camera 220, the microphone 224, the printer 252, the computer 226 and/or the computer 500 may operate exclusively off of DC power from the battery 240. This way the cart 102 may include only one main power converter instead of multiple power converters, one for each device. This arrangement reduces power conversion losses and thus increases efficiency and battery life. Additionally, the reduction in the number of power converters also reduces the overall weight of the cart 102.

The components of the cart 102 may be made of suitable materials selected in a well-known manner to reduce the overall weight of the cart 102 for enhancing portability, while maintaining sufficient strength and durability, and also for accommodating the external environment, size, configuration, assembly, and other factors that would be understood from the foregoing description. For example, the support members 106, 108, the strut member 118, the lateral braces 152, and hinge plates 170, 172 may be made of aluminum or other light-weight metals, or may be made of composites or durable plastics, such as ABS, PP, HDPE, PVC, and the like. Other components, such as the shell 160, the central upright frame 162, the central cross-member 146, the hinge locking mechanism 166, and the cases of the modules 112, 114 may be made of durable plastics, composite materials, or light-weight metals.

An exemplary portable medical cart has been described above, including a first and second support member pivotable between an open and closed position, and a central upright frame that guides a strut member from a retracted position to an upright extended position. The strut member is lockable in the upright extended position when the support members are in the open position, and a workstation module is mountable to and dismountable from the strut member. The workstation module may have an interface assembly, including a display, a camera, a speaker, and a microphone that enables the patient to communicate with a doctor that is located remotely from the cart. The workstation module may also include a caregiver workstation for connecting a computer to the interface assembly. A power module may be mounted to the cart and may be connected to the computer and/or interface assembly for providing power. The power module may be enclosed in a case that also includes a printer, which may be in communication with the computer. The power module may be pivotably mounted to pivot from an upright position to a horizontal position in which the power module straddles the support members and limits movement thereof.

The cart may quickly and easily be collapsed by pivoting the power module to the upright position, dismounting the workstation module, pivoting the support members together to the closed position, and retracting the strut member. A lockable pivoting assembly, such as a hinge mechanism, operatively connects the support members and may be in an unlocked state when the support members are in the open position for quickly and easily pivoting the support members to the closed position, for example, by lifting the frame. In the closed position, the pivoting assembly may automatically lock to limit relative movement of the support members for enhancing portability and storage. The pivoting assembly may thereafter be unlocked by depressing a button. The workstation module may be mounted to one of the support members during transportation, and wheels at a lower end of the cart also improves portability. The strut member may be configured as a handle that is extendable when the support members are locked in the closed position for facilitating pulling or pushing of the cart on the wheels.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A portable cart for mounting and dismounting a workstation for facilitating medical care, the cart comprising:
   a pair of collapsible support members pivotable relative to each other about a common axis between a closed position and an open position;
   a central upright frame configured to guide a strut member from a retracted position to an extended upright position; and
   a pivoting assembly pivotably disposed in relation to the central upright frame, wherein the pivoting assembly is operatively connected to the respective support members for enabling pivoting of the support members between the closed position and the open position.

2. The cart according to claim 1, wherein the pivoting assembly includes a pair of hinge plates that each rotate relative to each other about the common axis, and wherein the respective support members are operatively connected to the respective hinge plates.

3. The cart according to claim 2, wherein the respective hinge plates each have a locking slot, and
   wherein the pivoting assembly includes a locking pin configured for being received in the respective locking slots at a locked position to engage the respective hinge plates and restrict relative movement of the hinge plates.

4. The cart according to claim 3, wherein the locking pin is moveable relative to the respective hinge plates for selectively disengaging from the locked position and enabling the respective hinge plates to move relative to each other.

5. The cart according to claim 1, wherein the central upright frame includes a hub about which the respective hinge plates rotate, and
   wherein the central upright frame is vertically oriented perpendicular to the ground upon which the respective support members are placed.

6. The cart according to claim 5, wherein the respective hinge plates include axially extending holding tabs for engaging the central upright frame to restrict movement of the central upright frame relative to the hinge plates.

7. The cart according to claim 1, further including a slider mechanism operatively connected to a linkage, the linkage being operatively connected to the respective support members,
   wherein the slider mechanism is slidably moveable via the linkage between an upward position and a downward position in response to the support members respectively pivoting between the open position and the closed position.

8. The cart according to claim 7, wherein the slider mechanism is disposed within a guide slot of the central upright frame,
   wherein the slider mechanism includes a spring biased pawl moveable between a retracted position and an engaging position, the spring biased pawl being biased toward the engaging position,
   wherein, when the support members are pivotably disposed toward the closed position and the slider mechanism is slidably disposed toward the downward position, the spring biased pawl is in the retracted position; and
   wherein, when the support members are pivotably disposed toward the open position and the slider mechanism is slidably disposed toward the upward position, the spring biased pawl is in the engaging position and engages the strut member for locking the strut member in place when the strut member is in the extended position.

9. The cart according to claim 1, further comprising a workstation module that is mountable to and dismountable from the strut member when the strut member is in the upright extended position.

10. The cart according to claim 9, wherein the workstation module includes a recessed portion, and wherein an upper portion of the strut member is received within the recessed portion of the workstation module.

11. The cart according to claim 9, wherein the workstation module is mountable to and dismountable from one of the support members.

12. The cart according to claim 9, wherein the workstation module is enclosed within a case, the case having opposite first and second sides, the respective first and second sides each having a door for protecting or accessing respective first and second workstations on the respective first and second sides.

13. The cart according to claim 9, wherein the workstation module includes an interface assembly having a display, a speaker, a camera, and a microphone.

14. The cart according to claim 13, wherein the speaker and microphone are combined into a single unit, the combined speaker/microphone unit being mountable to and dismountable from the workstation module; and
   wherein the camera is swivably disposed on the workstation module.

15. The cart according to claim 13, wherein the workstation module includes a communications module configured to receive a video and audio communication corresponding to a transmission from a doctor at a location remote from a location of the cart and further configured to cause the video to show on the display and the audio to play through the speaker, the communication module further configured to receive a video image from the camera and sound from the microphone and to transmit the video image and the sound to the location remote from the location of the cart.

16. The cart according to claim 9, wherein the workstation module includes a caregiver workstation having a door hingedly connected to the workstation module and deployable from a closed position to an open position to form a workstation platform.

17. The cart according to claim 16, wherein the caregiver workstation includes a computer connected to an interface assembly and/or cables for connecting a computer to the interface assembly, wherein the computer is optionally detachable from the workstation module and/or deployable in a wireless configuration to communicate with the interface assembly via a wireless communication interface.

18. The cart according to claim 9, further including a power module mounted to one of the support members, the power module including a power source for providing power to an interface assembly and/or a computer.

19. The cart according to claim 18, wherein the power module includes a printer, the printer configured to communicate with the computer.

20. The cart according to claim 18, wherein the power module is pivotably mounted to one of the support members and pivotable between an upright storage position and a horizontal working position in which the power module straddles the respective support members.

21. The cart according to claim 1, wherein:
   each of the support members includes a pair of legs laterally spaced from each other;
   two pairs of hinge plates are laterally spaced from each other, the respective pairs of hinge plates operatively connected to the respective legs;
   a pair of central upright frames are laterally spaced from each other and are centrally disposed relative to the respective pairs of hinge plates;
   a central cross-member operatively connects the pair of central upright frames; and
   the respective legs include wheels at respective lower ends for enhancing the portability of the cart.

22. The cart according to claim 1, wherein the strut member is configured as a handle for enabling the user to grasp the handle and transport the cart when the cart is collapsed into a transportation mode, and
   wherein the central upright frame includes a detent configured to selectively maintain the handle in the extended position or the retracted position.

23. A portable cart having a collapsible frame, comprising:
   a pair of support members pivotable relative to each other about a common axis between an open position and a closed position, and
   a lockable hinge mechanism connecting respective upper portions of the support members, the hinge mechanism including:
      opposing hinge plates each having a locking slot radially spaced from the common axis, the hinge plates being rotatable relative to each other about the common axis; and
      a locking pin axially extending into the respective locking slots, the locking pin being radially moveable within the respective locking slots for enabling the respective hinge plates to move relative to each other between a locked position and an unlocked position;
      wherein the respective locking slots are configured with a lock portion having a surface for engaging the locking pin in the locked position and restricting relative movement of the hinge plates when the support members are in the closed position; and wherein the respective locking slots are configured with an unlock portion having a surface for engaging the locking pin in the unlocked position that enables radial movement of the locking pin for permitting the relative movement of the hinge plates when the support members are in the open position.

24. The cart according to claim 23, wherein the respective lock portion surfaces are radially extending surfaces configured to engage a side of the locking pin perpendicular to the radially moveable direction of the locking pin to restrict radial movement of the locking pin and to restrict relative movement of the respective hinge plates.

25. The cart according to claim 23, wherein the respective unlock portion surfaces are ramped surfaces respectively configured to engage and radially move the locking pin in response to the rotational movement of the respective hinge plates.

26. The cart according to claim 23, wherein the locking pin axially extends from a lock slide, the lock slide moveable in the radial direction for effecting radial movement of the locking pin.

27. The cart according to claim 26, wherein the lock slide is received within a groove of a lock plate, the lock slide being spring biased in the radially outward direction, and wherein the lock plate is operatively connected to a central upright frame configured to limit rotational movement of the lock plate.

28. The cart according to claim 27, wherein a shell encases the hinge plates, and wherein an upper portion of the lock slide is configured as a button that is accessible through an opening in the shell.

29. The cart according to claim 23, including:
a plurality of locking pins; and
a plurality of locking slots radially spaced in each hinge plate;
wherein, the respective locking slots are configured for receiving a respective locking pin.

30. The cart according to claim 23, further including:
an upright frame member having at least one sliding assembly operable to position a strut member from a retracted state to an extended state; and
a workstation module configured to mount to and dismount from the strut member.

31. The cart according to claim 30, including a slider mechanism operatively connected to a linkage, the linkage being operatively connected to the respective support members;
wherein the slider mechanism is slidably disposed within a guide slot of the upright frame member, the guide slot having a back guiding surface, and wherein the slider mechanism is slidably moveable via the linkage between an upward position and a downward position;
wherein the strut member is slidably disposed within a groove of the upright frame member that is opposite the guide slot;
wherein the slider mechanism includes a spring biased pawl moveable between a retracted position and an engaging position, the spring biased pawl being biased toward the engaging position;
wherein, when the support members are pivotably disposed toward the closed position, the slider mechanism is slidably disposed toward the downward position, and the spring biased pawl engages the back guiding surface of the guide slot and is forced toward the retracted position; and
wherein, when the support members are pivotably disposed toward the open position, the slider mechanism is slidably disposed toward the upward position, and the spring biased pawl extends through an opening in the back guiding surface of the guide slot to lockingly engage the strut member through an opening in the strut member when the strut member is in the extended position.

32. The cart according to claim 30, wherein the hinge plates include an outer hinge plate disposed axially adjacent to an inner hinge plate;
wherein the respective hinge plates each include a pair of holding tabs configured to extend axially inwardly toward the upright frame member;
wherein the inner hinge plate includes apertures for interlockingly receiving the respective holding tabs of the outer hinge plate; and
wherein the respective holding tabs of the inner hinge plate and the outer hinge plate are configured to engage the upright frame member in a scissoring action to limit movement of the upright frame member relative to the hinge plates.

33. A method of deploying a portable cart for facilitating medical care, comprising the steps:
unlocking a hinge mechanism operatively connected to a pair of support members positioned proximal each other in a closed state, the hinge mechanism being pivotably disposed in relation to a central upright frame that guides an extendable strut member;
pivoting the support members away from each other from the closed position to an open position, and simultaneously moving a sliding assembly into a position for lockingly engaging the strut member;
extending the strut member from a retracted position to an extended position;
locking the strut member in place with the sliding assembly; and
mounting a workstation module onto the strut member.

* * * * *